(12) United States Patent
Pauly

(10) Patent No.: US 8,224,829 B2
(45) Date of Patent: Jul. 17, 2012

(54) DATABASE

(75) Inventor: Duncan Gunther Pauly, Box (GB)

(73) Assignee: Bernard Consulting Limited, Tortola (VG)

( * ) Notice: Subject to any disclaimer, the term of this patent is extended or adjusted under 35 U.S.C. 154(b) by 1241 days.

(21) Appl. No.: 10/432,769

(22) PCT Filed: Nov. 28, 2001

(86) PCT No.: PCT/GB01/05242
§ 371 (c)(1), (2), (4) Date: May 28, 2003

(87) PCT Pub. No.: WO02/44940
PCT Pub. Date: Jun. 6, 2002

(65) Prior Publication Data
US 2004/0015478 A1 Jan. 22, 2004

(30) Foreign Application Priority Data
Nov. 30, 2000 (GB) .................................. 0029238.3

(51) Int. Cl.
G06F 7/00 (2006.01)
G06F 17/30 (2006.01)
(52) U.S. Cl. ........................................ 707/758; 707/802
(58) Field of Classification Search .................. 707/100, 707/10, 101, 102, 104.1, 1–4, 103 R
See application file for complete search history.

(56) References Cited

U.S. PATENT DOCUMENTS
3,593,309 A   7/1971  Clark et al.
5,117,349 A * 5/1992  Tirfing et al. ...................... 707/3
5,121,495 A   6/1992  Nemes
(Continued)

FOREIGN PATENT DOCUMENTS
EP       0 453 193 A2   10/1991
(Continued)

OTHER PUBLICATIONS

Sun et al., "Dynamic Query Range for Multikey Searching", Computer Software and Applications Conference, 1990, COMPSAC 90 Proceedings, 14th Annual International, Chicago, IL, Oct. 31-Nov. 2, 1990, IEEE, pp. 118-123.

(Continued)

Primary Examiner — Usmaan Saeed
(74) Attorney, Agent, or Firm — Wolf, Greenfield & Sacks, P.C.

(57) ABSTRACT

A database is provided in which an index for the database is provided as a hierarchical structure of nodes that are navigated during a search until a conclusion set is reached. The structure is organized such that key information relating to a node is inferred from the position of the node in the structure. The index is queried using a search criterion having at least one key, each key including at least one key symbol, in order to locate data matching the search criterion. The index is a hierarchical structure of nodes that is navigated during a search until a conclusion set satisfying the search criterion is reached, and the index is searched by comparing, at each node, a decision group within the search key with a decision value associated with the node. The structure is organized such that the key symbols are not stored at a node in the structure, and each node has less than three exit paths therefrom.

48 Claims, 27 Drawing Sheets

U.S. PATENT DOCUMENTS

| | | | |
|---|---|---|---|
| 5,283,894 A | | 2/1994 | Deran |
| 5,355,473 A * | | 10/1994 | Au .................................... 707/3 |
| 5,497,485 A * | | 3/1996 | Ferguson et al. ................. 707/1 |
| 5,551,027 A | | 8/1996 | Choy et al. |
| 5,553,284 A | | 9/1996 | Barbara et al. |
| 5,560,007 A * | | 9/1996 | Thai ................................. 707/3 |
| 5,619,199 A | | 4/1997 | Watts et al. |
| 5,629,695 A * | | 5/1997 | Watts et al. .................... 341/51 |
| 5,655,129 A | | 8/1997 | Ito |
| 5,664,179 A | | 9/1997 | Tucker |
| 5,689,699 A | | 11/1997 | Howell et al. |
| 5,706,495 A * | | 1/1998 | Chadha et al. .................... 707/2 |
| 5,768,581 A * | | 6/1998 | Cochran .......................... 707/5 |
| 5,806,065 A | | 9/1998 | Lomet |
| 5,819,286 A * | | 10/1998 | Yang et al. ....................... 707/1 |
| 5,899,992 A | | 5/1999 | Iyer et al. |
| 5,926,820 A | | 7/1999 | Agrawal et al. |
| 5,995,979 A * | | 11/1999 | Cochran .................... 707/104.1 |
| 6,041,053 A * | | 3/2000 | Douceur et al. ............. 370/389 |
| 6,047,046 A | | 4/2000 | Smets et al. |
| 6,115,716 A | | 9/2000 | Tikkanen et al. |
| 6,208,987 B1 | | 3/2001 | Nihei |
| 6,345,266 B1 * | | 2/2002 | Ganguly et al. ................. 707/1 |
| 6,356,888 B1 * | | 3/2002 | Egan et al. ....................... 707/2 |
| 6,370,518 B1 * | | 4/2002 | Payne et al. ...................... 707/1 |
| 6,421,664 B1 * | | 7/2002 | Groeschel et al. ............... 707/2 |
| 6,681,218 B1 * | | 1/2004 | Zou .................................. 707/3 |
| 6,938,046 B2 * | | 8/2005 | Cooke et al. .................. 707/101 |
| 7,043,641 B1 * | | 5/2006 | Martinek et al. .............. 713/187 |
| 2002/0059281 A1 | | 5/2002 | Watanabe et al. |

FOREIGN PATENT DOCUMENTS

| | | |
|---|---|---|
| EP | 1 052 576 A2 | 11/2000 |
| JP | 63-285629 | 11/1988 |
| JP | 03-008083 | 1/1991 |
| JP | 05-120339 | 5/1993 |
| JP | 05-334153 | 12/1993 |
| JP | 06-505816 | 6/1994 |
| JP | 09-036747 | 2/1997 |
| JP | 10-040255 | 2/1998 |
| JP | 11-039314 | 2/1999 |
| JP | 11039314 | 2/1999 |
| JP | 11212980 | 8/1999 |
| JP | 2000-076106 | 3/2000 |
| WO | WO 92/06440 A1 | 4/1992 |
| WO | WO 99/38094 A1 | 7/1999 |
| WO | WO 9938094 A1 | 7/1999 |
| WO | WO 99/52098 A2 | 10/1999 |
| WO | WO 00/58865 A1 | 10/2000 |

OTHER PUBLICATIONS

Kriegel et al., "PLOP-Hashing: A Grid File Without Directory", Data Engineering, 1988, Proceedings Fourth International Conference in Los Angeles, CA, Feb. 1-5, 1988, IEEE, pp. 369-376.

European examination report dated Sep. 26, 2006 from corresponding International Application No. EP 01998908.6.

W. Marek et al., A Theory of Nonmonotonic Rule Systems, IEEE, 1990, pp. 79-94.

Allen Ambler, selected excerpts from EECS 188: Computational Problem Solving, Course Notes, spring 1998, as found at designlab.ukans.edu/~ambler/188/coursenotes.html.

Theodore A. Norman, selected excerpts from CS453 Database Implementation, winter 1998, as found at cs.byu.edu/courses/cs453/.

Search Report dated Oct. 25, 2001 for corresponding British Application No. GB 0029238.3.

Examination Report dated Mar. 30, 2004 for corresponding British Application No. GB 0029238.3.

Search Report dated Oct. 13, 2003 for corresponding International Application No. PCT/GB01/05242.

Written Opinion dated Sep. 2, 2003 for corresponding International Application No. PCT/GB01/05242.

IBM TDB, "Ordinal Access to the element of Data Structures Based on Binary Trees," IP.Com Inc., Jul. 1, 1976, p. 607-608, West Henrietta, NY, US.

IBM TDB, "A Structure for Matching Records using a Sorted Binary Tree," IP.Com Inc., Mar. 1, 1993, n. 347: 3-93, West Henrietta, NY, US.

Summons to attend oral proceedings pursuant to Rule 115(1) EPC, Mar. 3, 2008.

Translation of Japanese Office Action mailed May 15, 2007.

Translation of Japanese Office Action dated Nov. 20, 2007.

* cited by examiner

Fig. 1

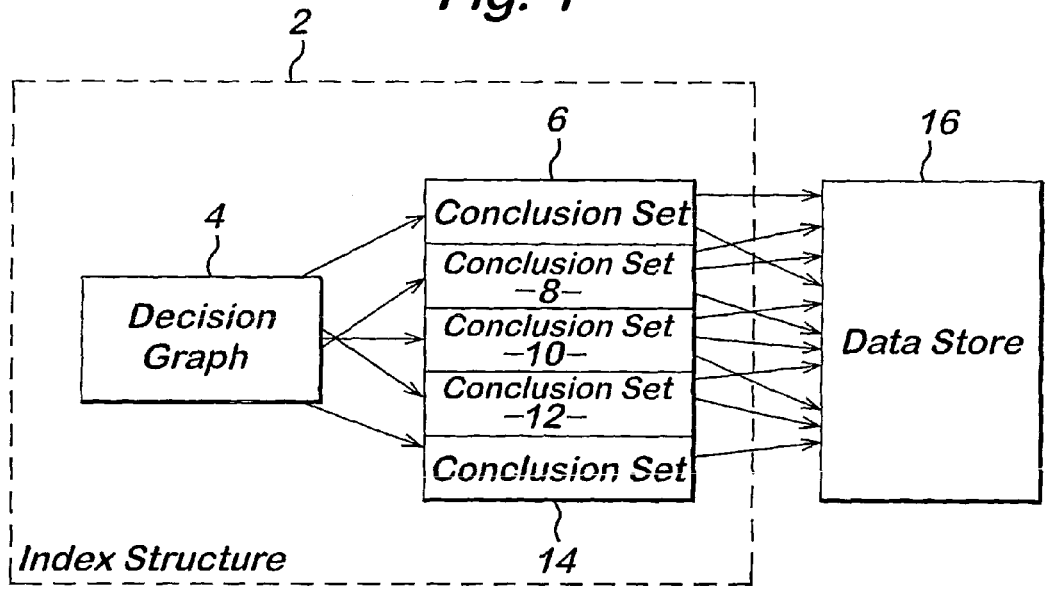

Navigation
1. All navigation starts at the Origin within the Decision Graph.
2. Decision Nodes within the Decision Graph are followed until a Conclusion Set is found or no further navigation is possible.
3. All key entries in the Concusion Set are scanned to find the required keys.

Fig. 2

Logical Structure of a Decision Graph

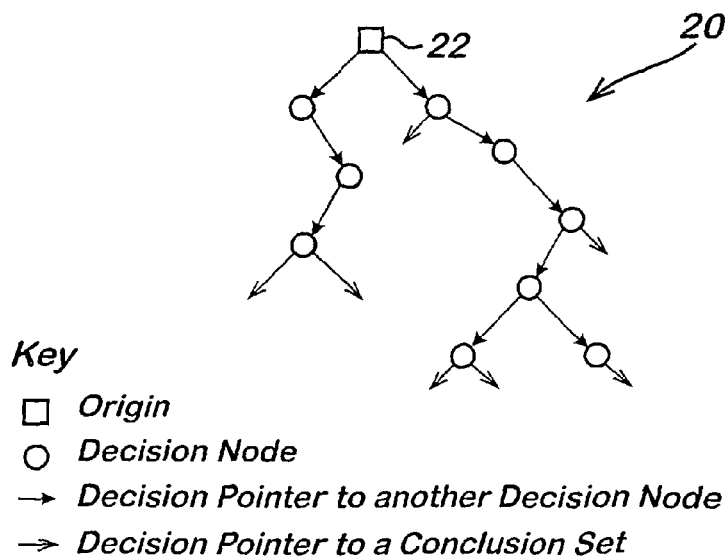

Key
- □ Origin
- ○ Decision Node
- → Decision Pointer to another Decision Node
- ⇢ Decision Pointer to a Conclusion Set

Fig. 3
Logical Structure of a Decision Node

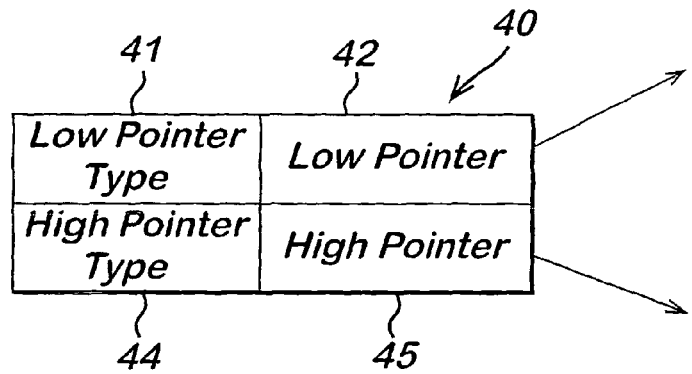

Notes
1. The Low Pointer Type indicates the purpose of the Low Pointer. It can indicate if the pointer points to a Decision Node or Conclusion Set.
2. The Low Pointer gives the address of the Decision Node or of the Conclusion Set that it points to. A zero value can indicate that no pointer exists.
3. The High Pointer Type indicates the purpose of the High pointer. It can indicate if the pointer points to a Decision Node or Conclusion Set.
4. The High Pointer gives the address of the Decision Node or of the Conclusion Set that it points to. A zero value can indicate that no pointer exists.

Fig. 4
The Logical Structure of a Conclusion Set

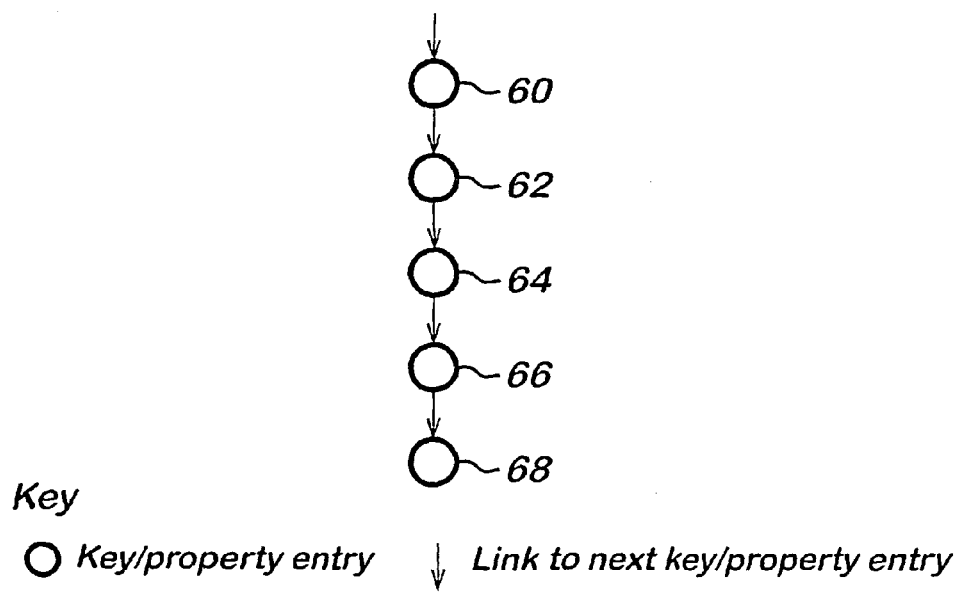

Key

O  Key/property entry         ↓ Link to next key/property entry

Fig. 5
Logical Structure of a Conclusion Set Entry

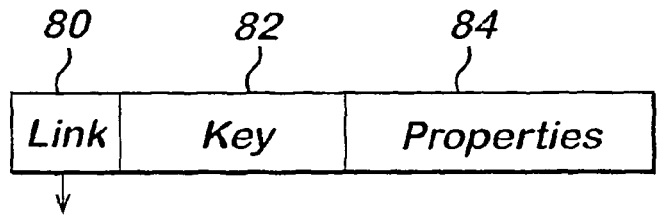

Notes
1. The Link field points to the next Conclusion Set Entry. A zero value can indicate that there are no more entries.
2. The Key field holds the exact key value.
3. The Properties field hold the properties associated with the key.

Fig. 11
Procedure (G) for Range Query with Min Key (I), Max Key (A) Returning Result (R)

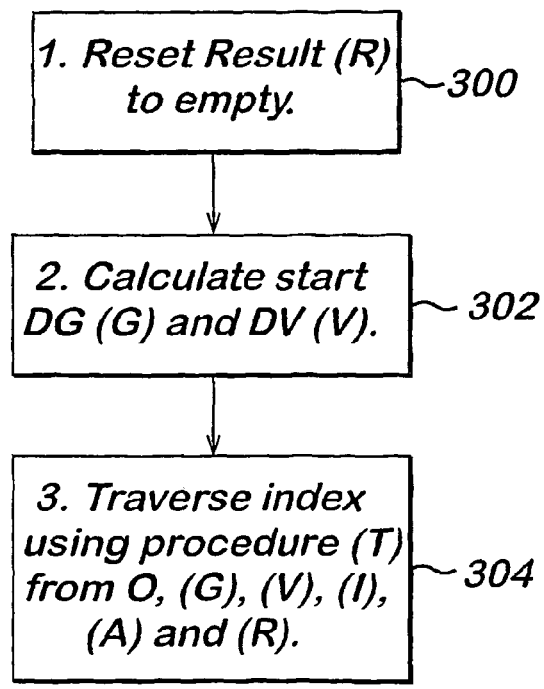

Abreviation key
CS-Conclusion Set; DG-Decision Group; DN-Decision Node; DP-Decision Pointer; DV-Decision Value; HP-High Pointer; LP-Low Pointer; O-Origin;

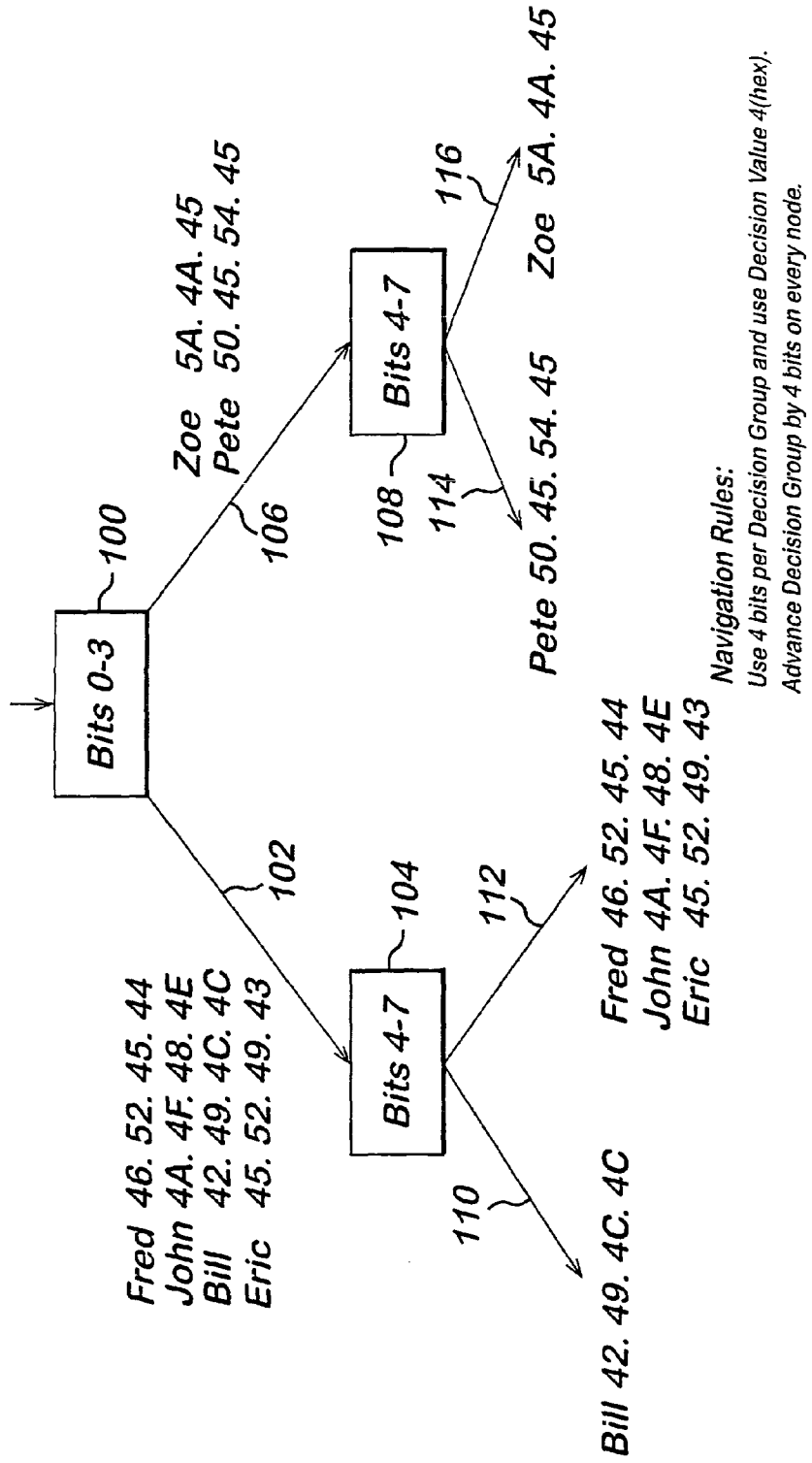

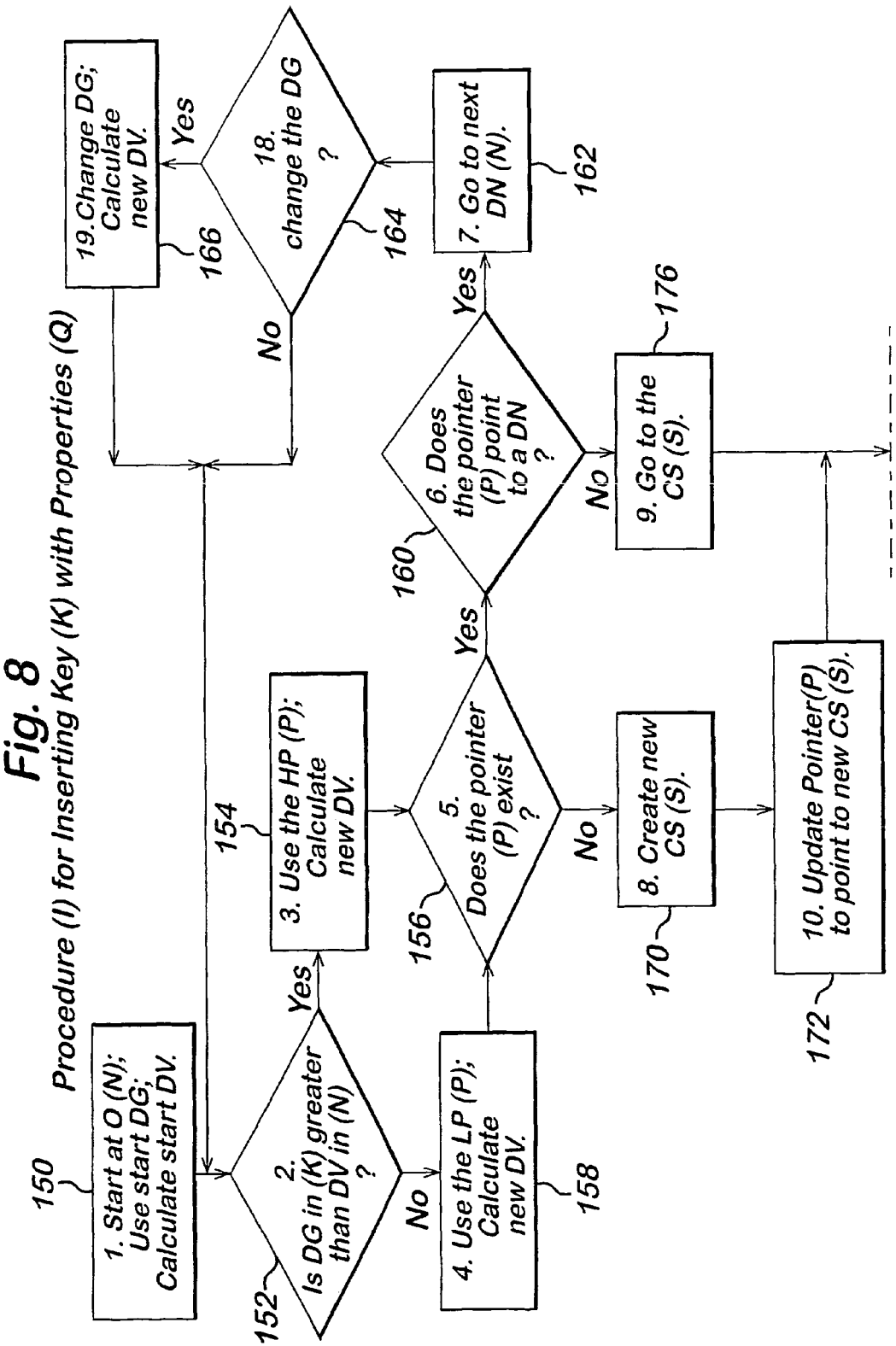

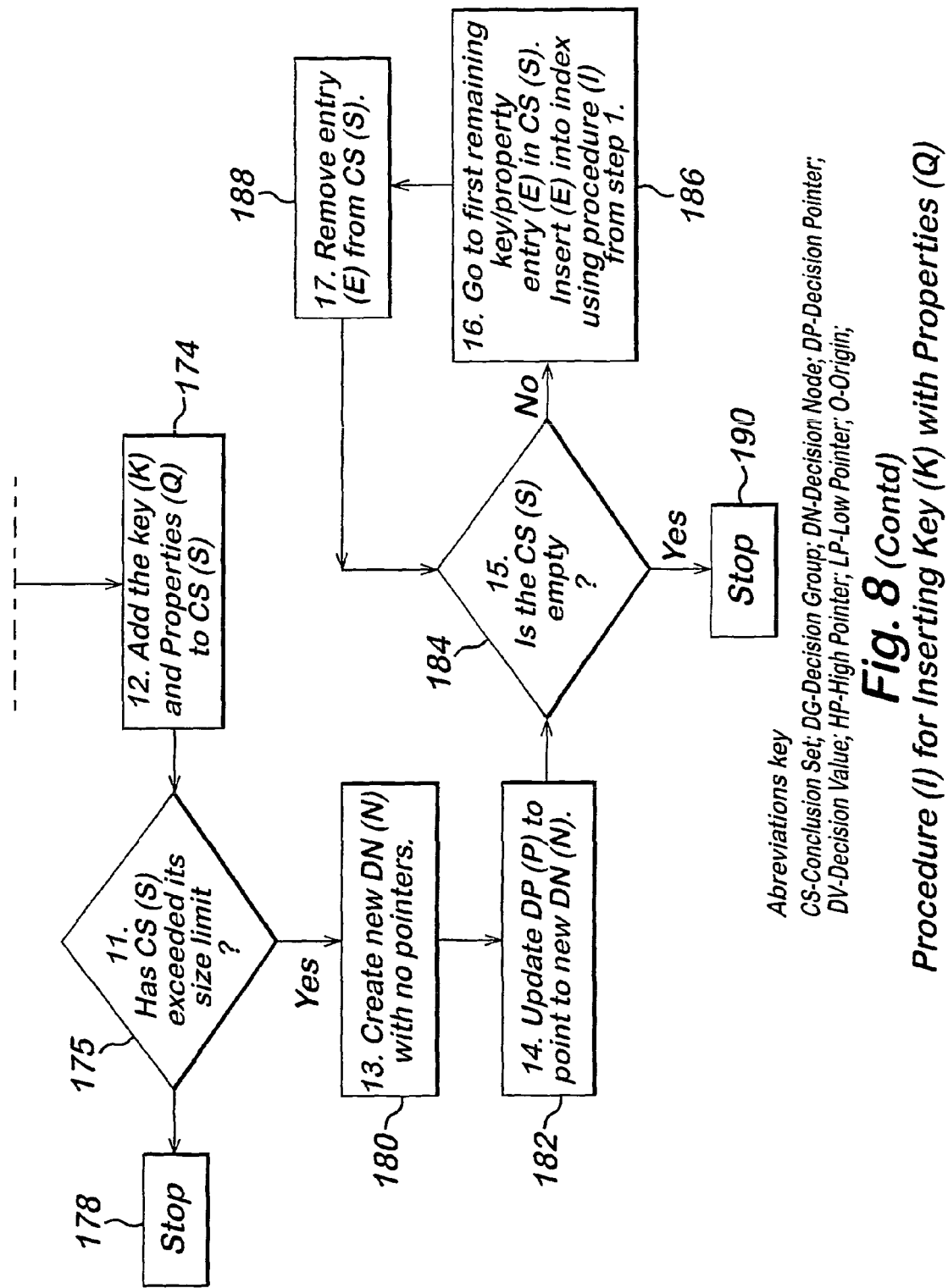
Fig. 8 *(Cont'd)*
Procedure (I) for Inserting Key (K) with Properties (Q)

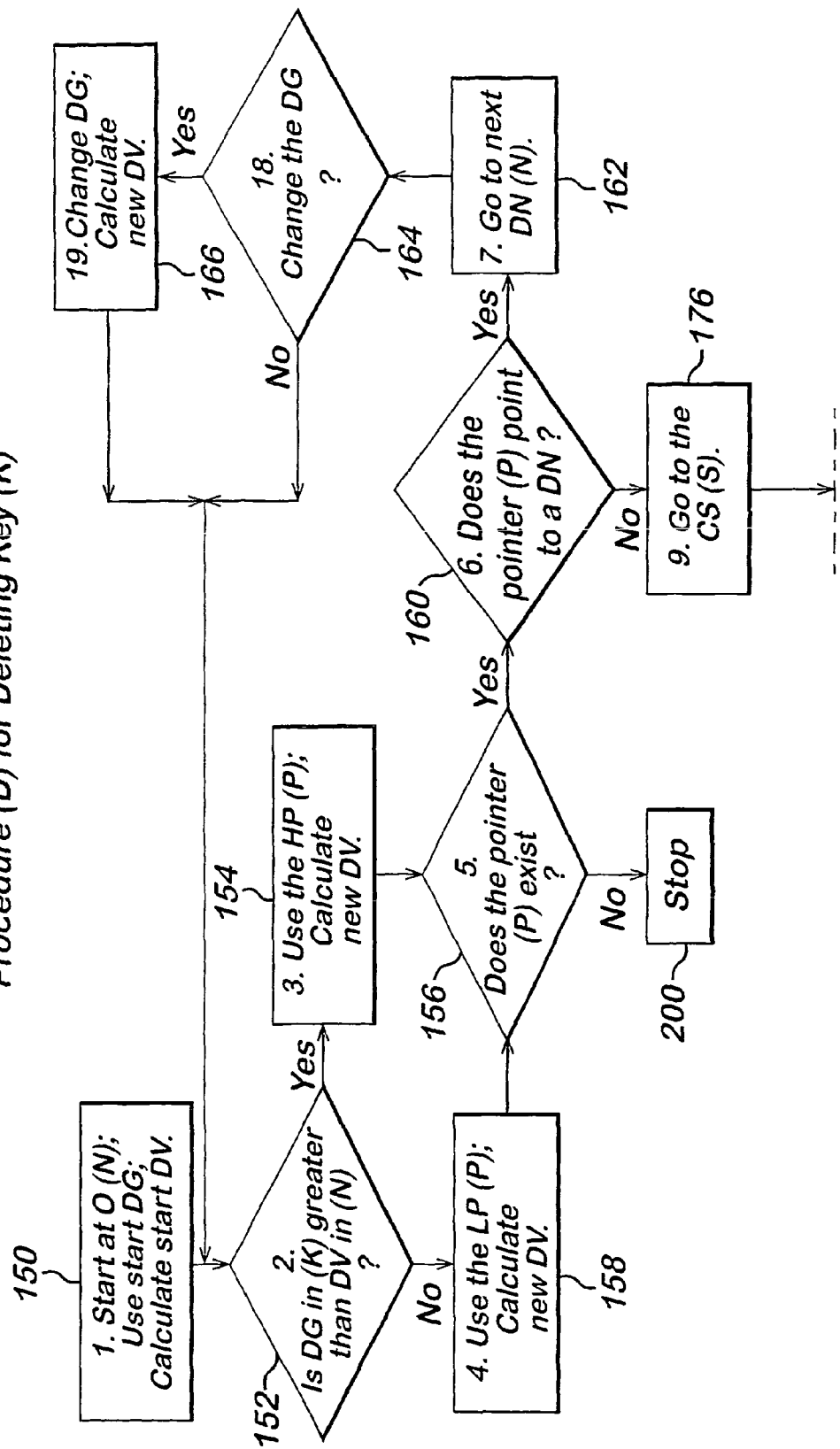

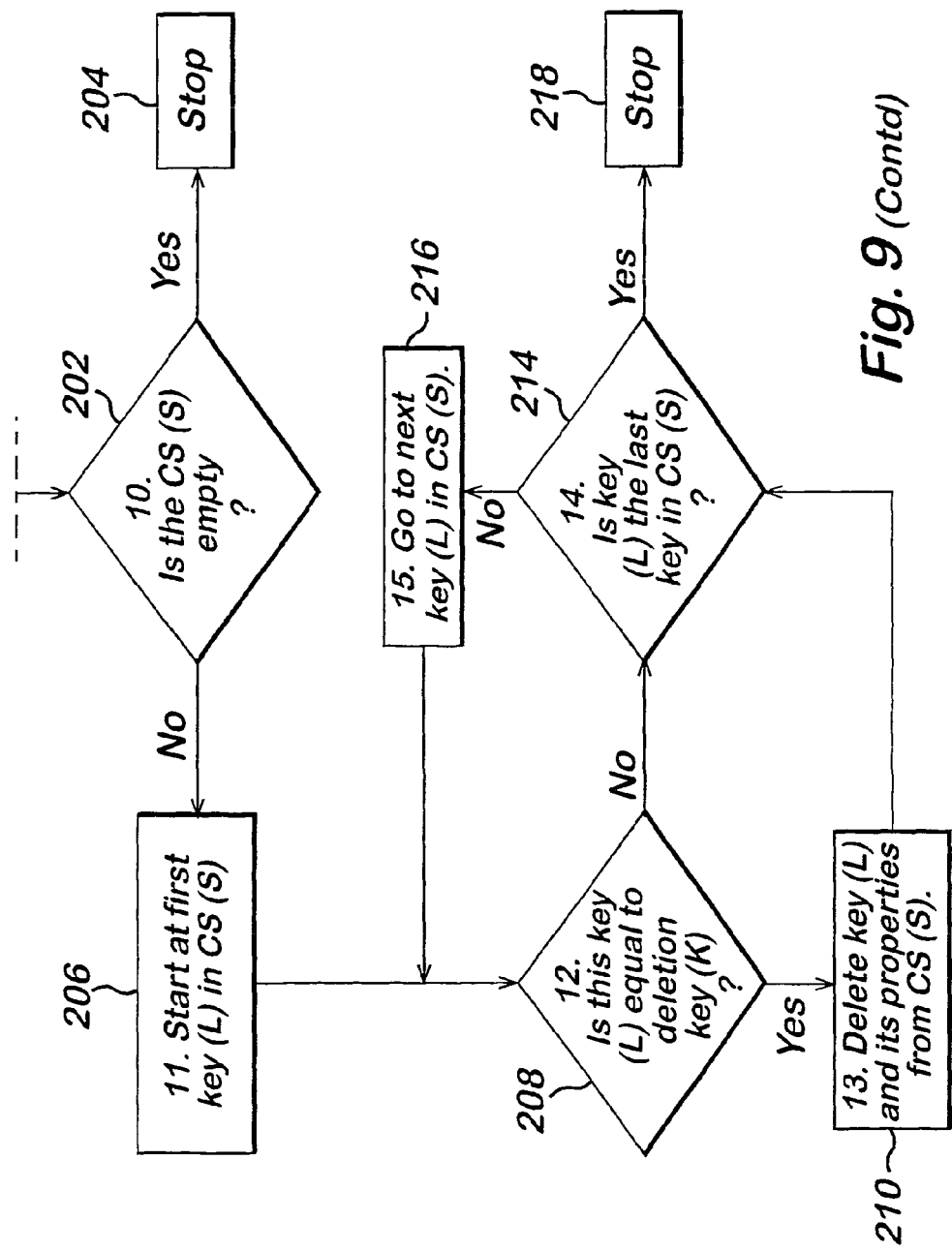

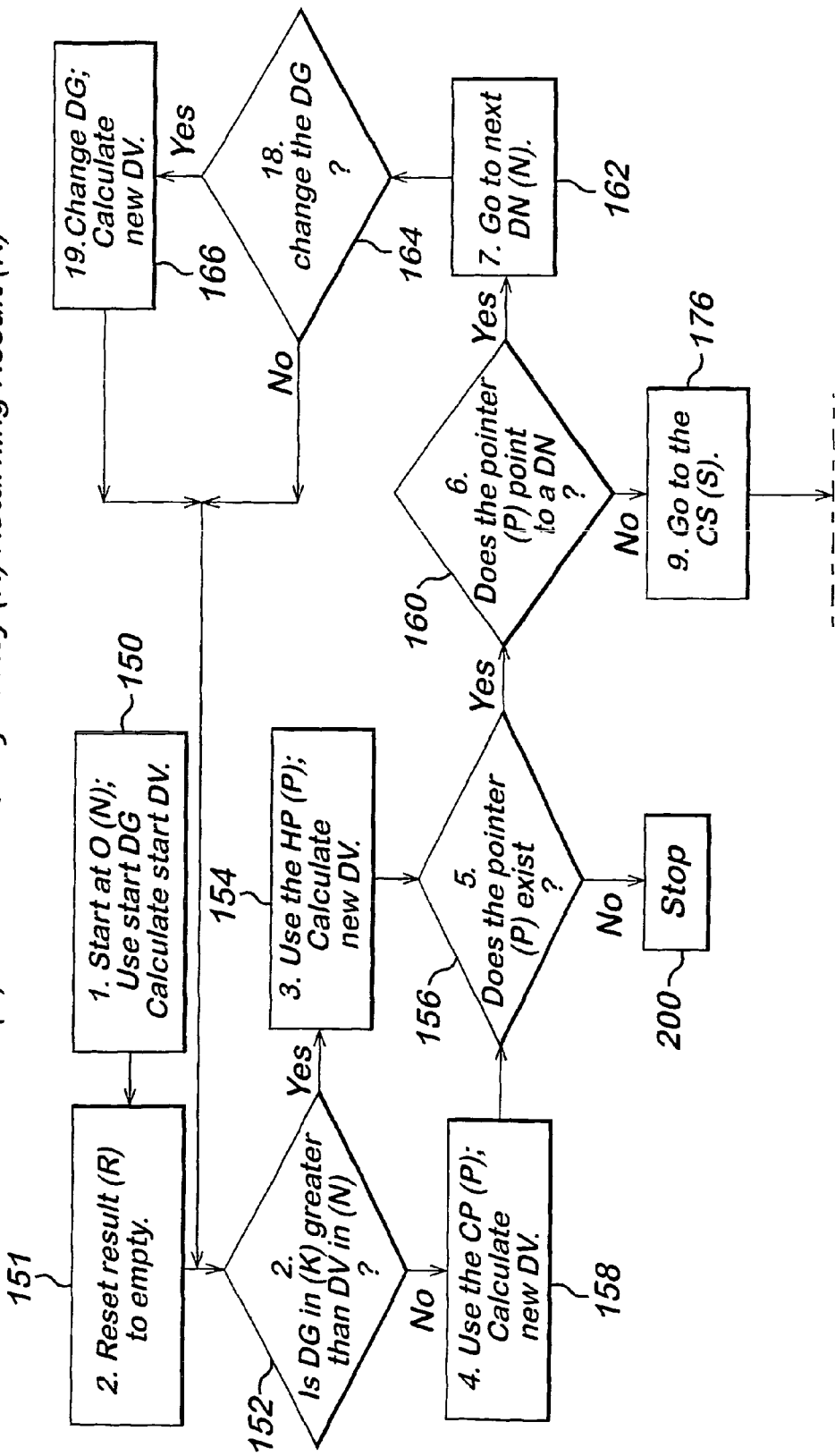
Fig. 10 Procedure (E) for Exact Query of Key (K) Returning Result (R)

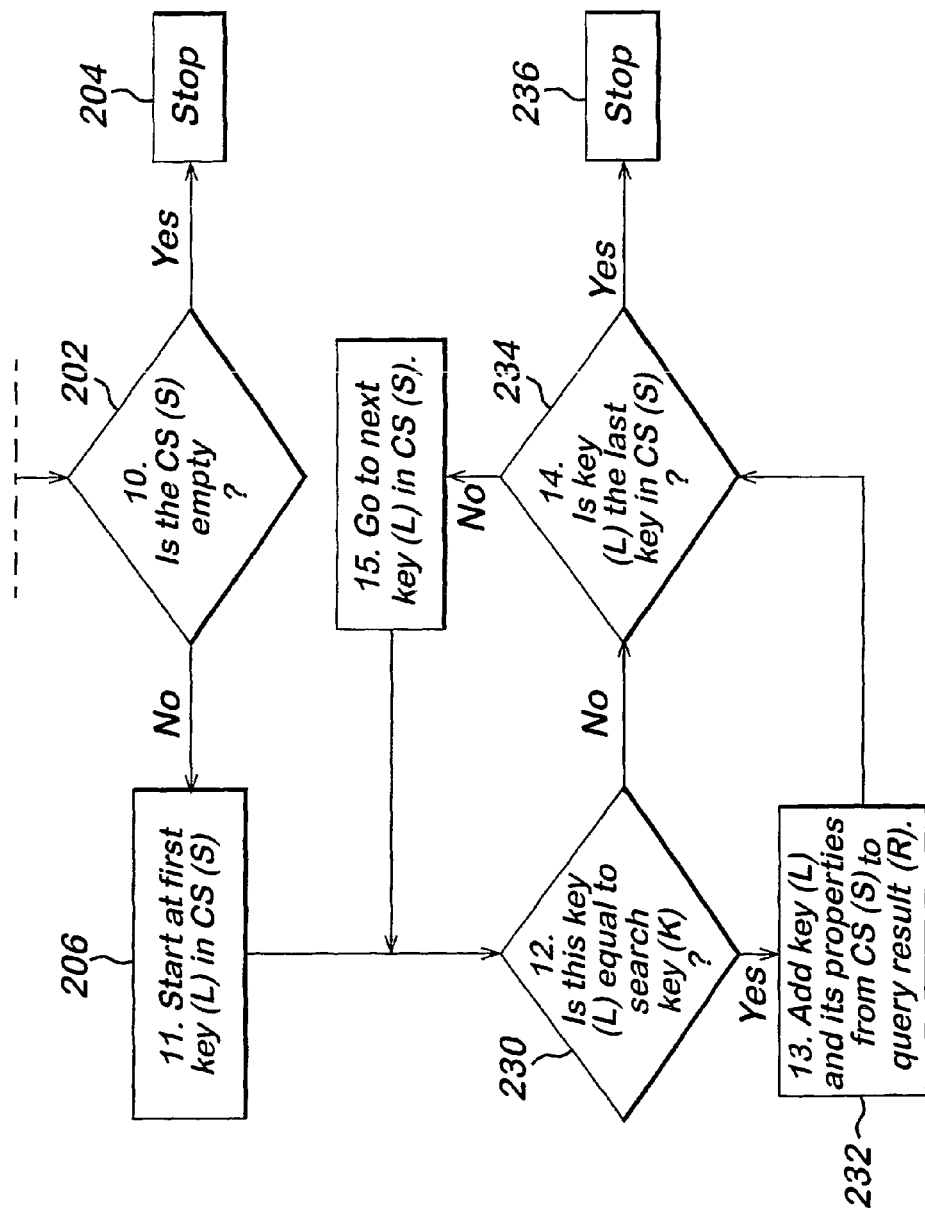
Fig. 10 (Contd)

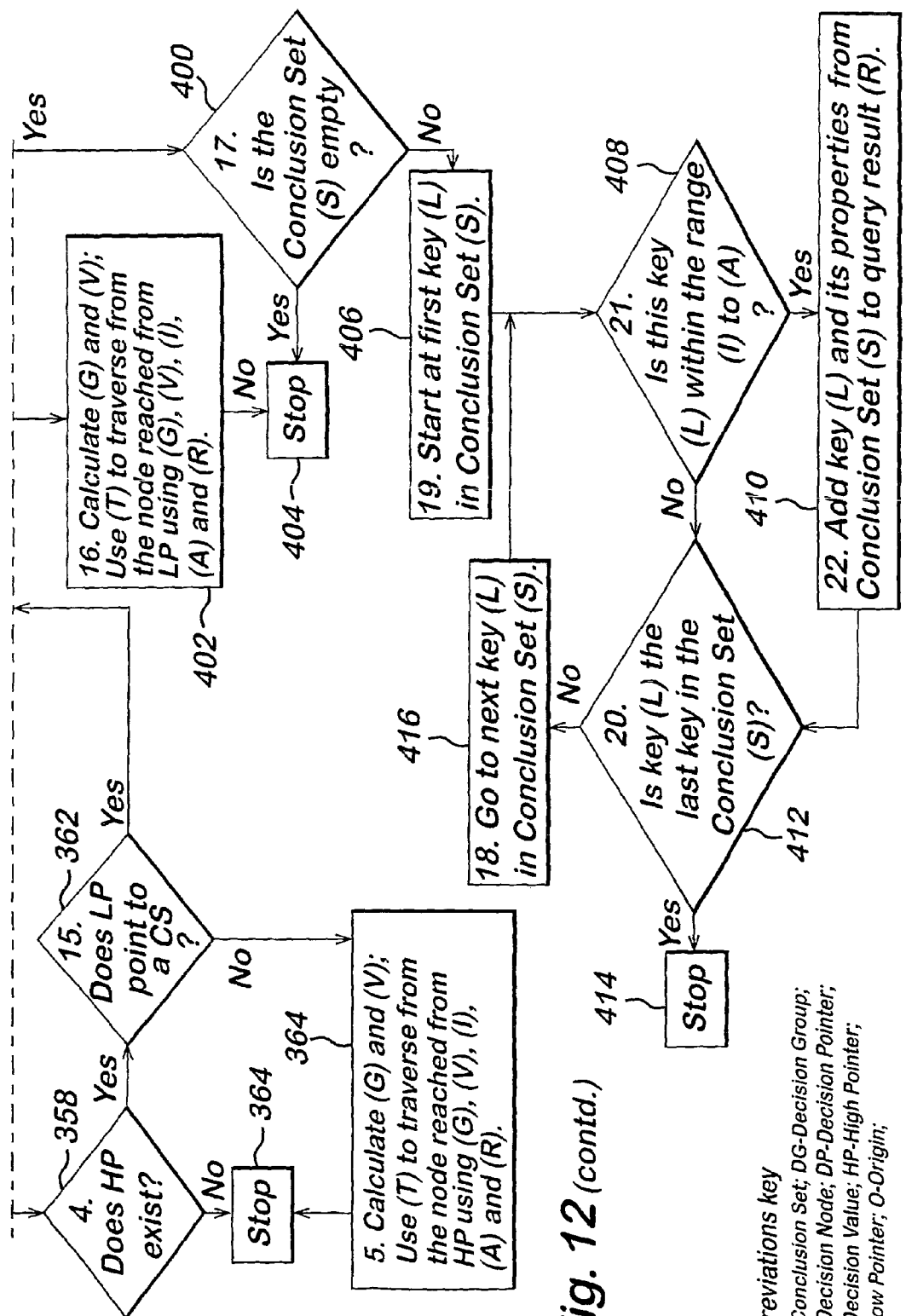
Fig. 12 (contd.)
Abreviations key
CS-Conclusion Set; DG-Decision Group;
DN-Decision Node; DP-Decision Pointer;
DV-Decision Value; HP-High Pointer;
LP-Low Pointer; O-Origin;

Fig. 13
Logical Structure of a Decision Graph

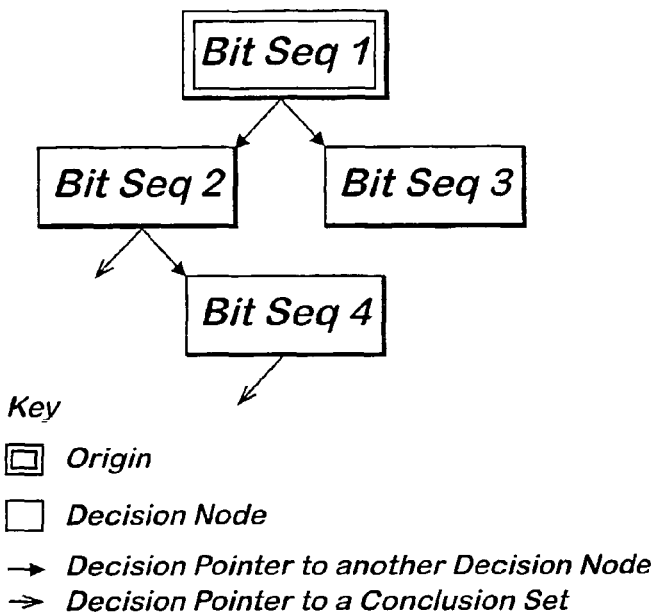

Key

▣ Origin

☐ Decision Node

→ Decision Pointer to another Decision Node

⇢ Decision Pointer to a Conclusion Set

Fig. 14
Logical Structure of a Decision Node

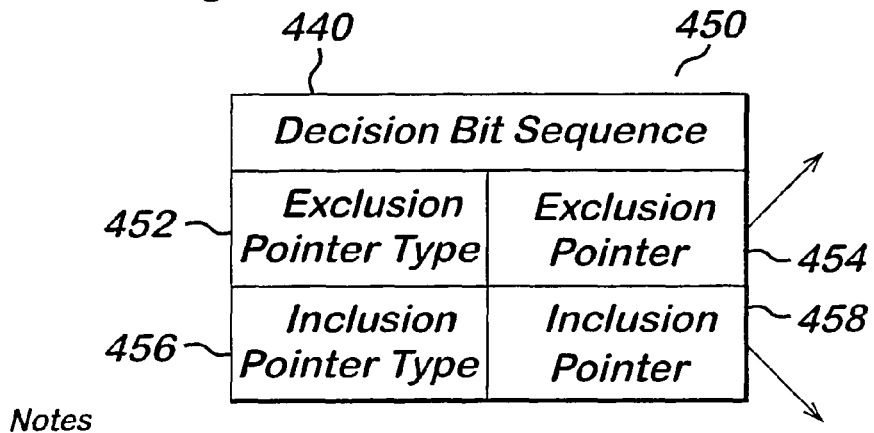

Notes

1. The Decision Bit Sequence contains an arbitrary long sequence of bits.
2. The Exclusion Pointer Type indicates the purpose of the Exclusion Pointer. It can indicate if the pointer points to a Decision Node or Conclusion Set.
3. The Exclusion Pointer gives the address of the Decision Node or of the Conclusion Set that it points to. A zero value can indicate that no pointer exists.
4. The Inclusion Pointer Type indicates the purpose of the Inclusion Pointer. It can indicate if the pointer points to a Decision Node or Conclusion Set.
5. The Inclusion Pointer gives the address of the Decision Node or of the Conclusion Set that it points to. A zero value can indicate that no pointer exists.

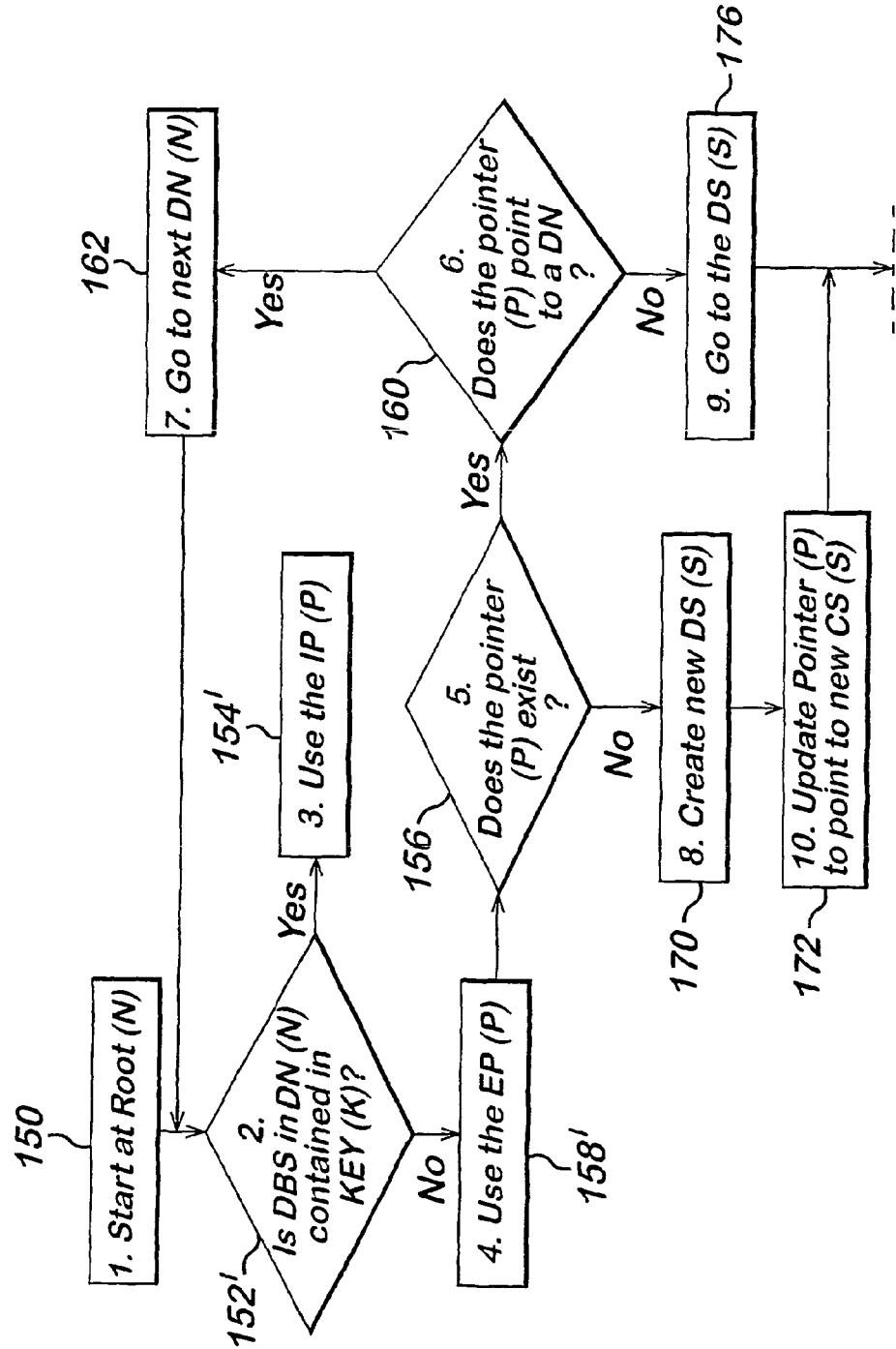

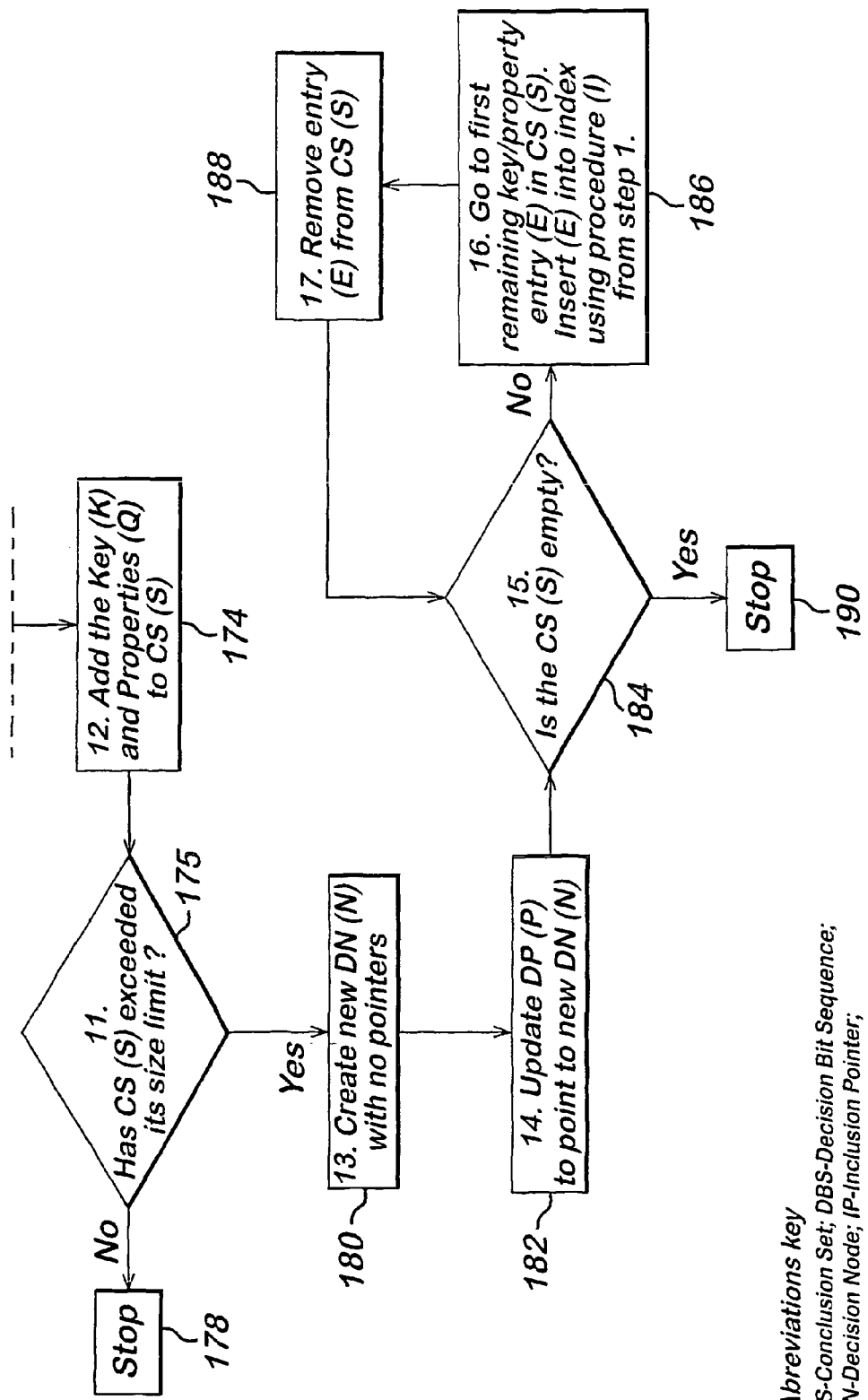
Fig. 15 (contd)
Abreviations key
CS-Conclusion Set; DBS-Decision Bit Sequence;
DN-Decision Node; IP-Inclusion Pointer;
EP-Exclusion Pointer; R-Root;

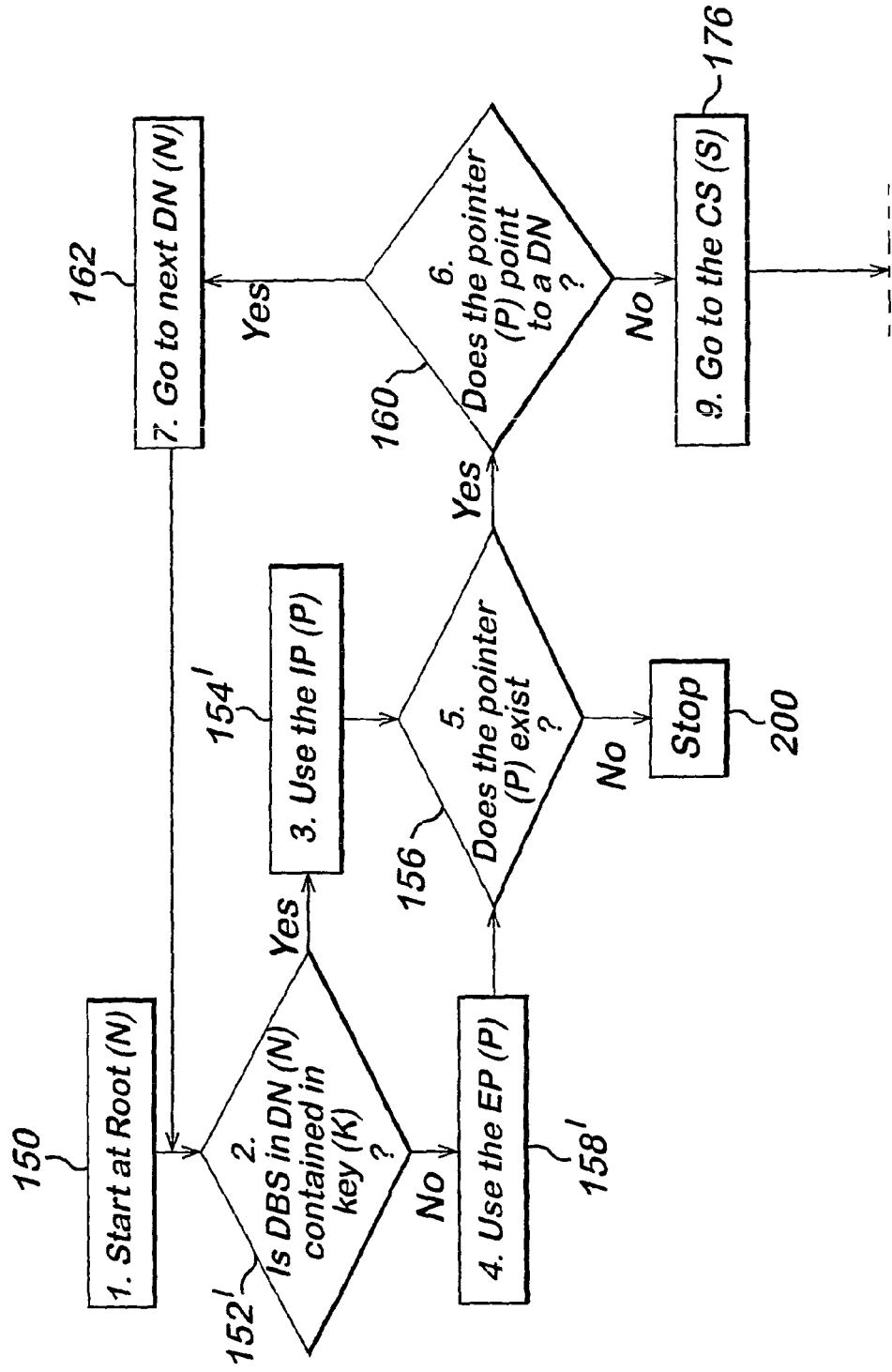

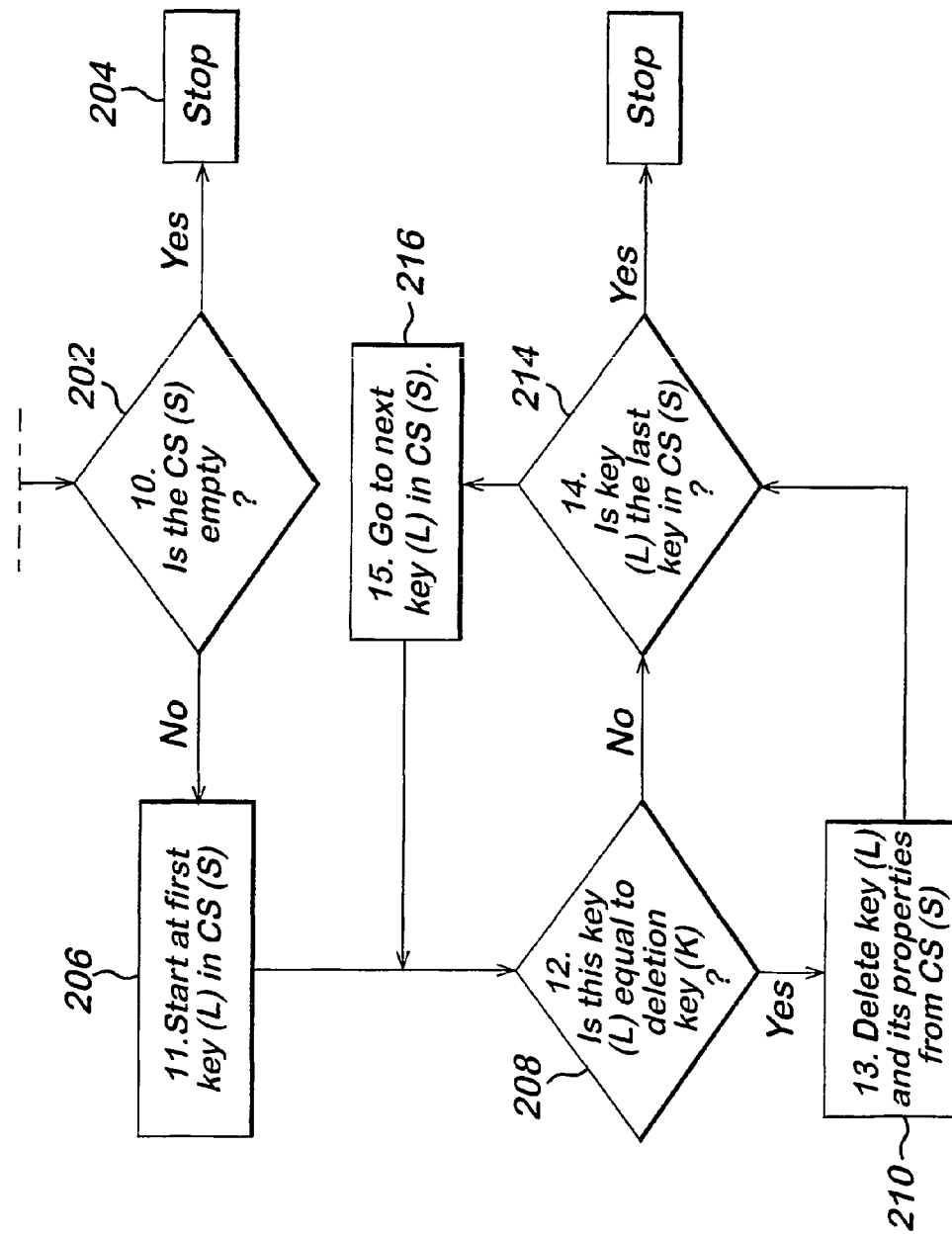
Fig. 16 (Contd)
Abreviations key
CS-Conclusion Set; DBS-Decision Bit Sequence;
DN-Decision Node; IP-Inclusion Pointer;
EP-Exclusion Pointer; R-Root;

Procedure (E) for Exact Query of Key (K) Returning Result (R)

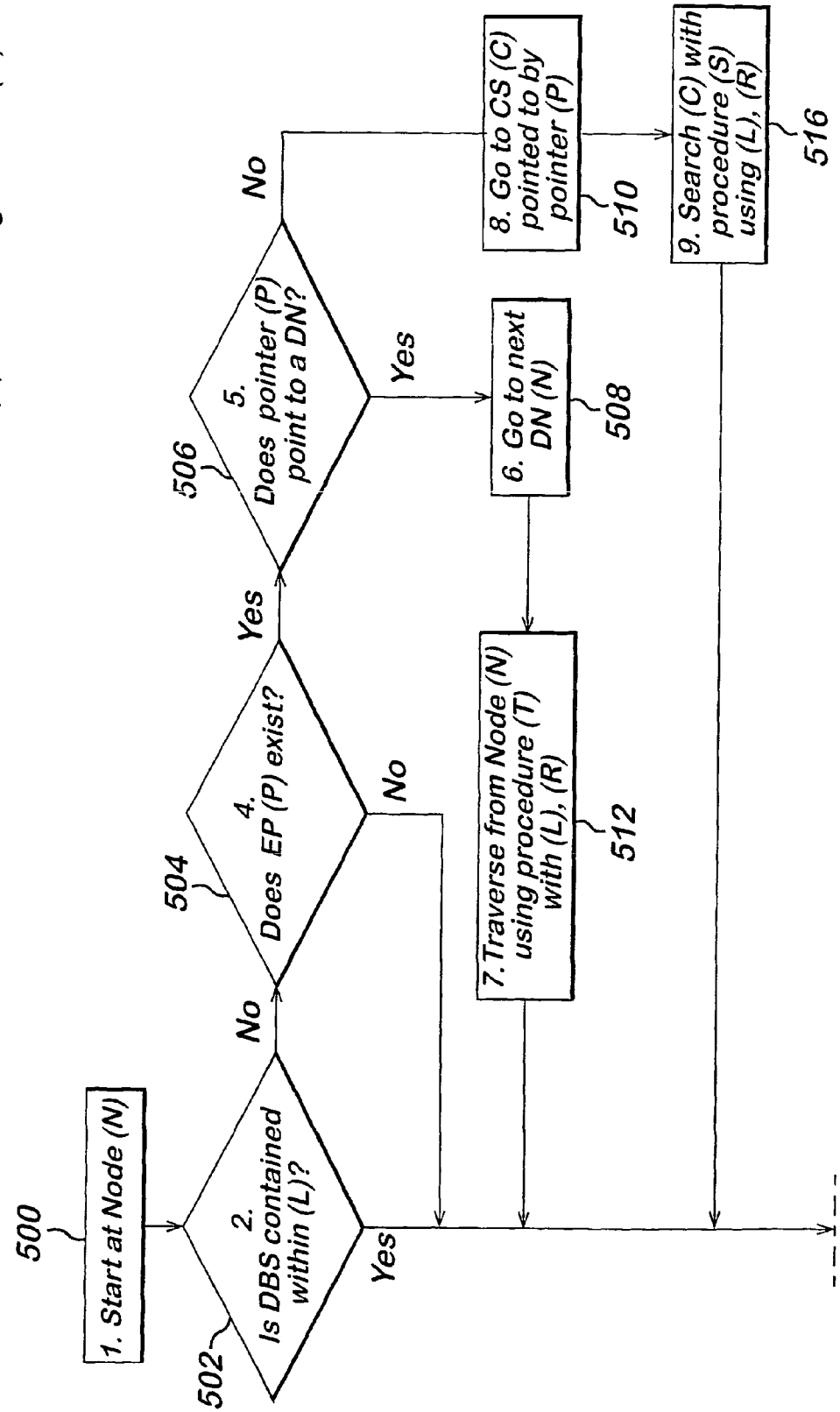

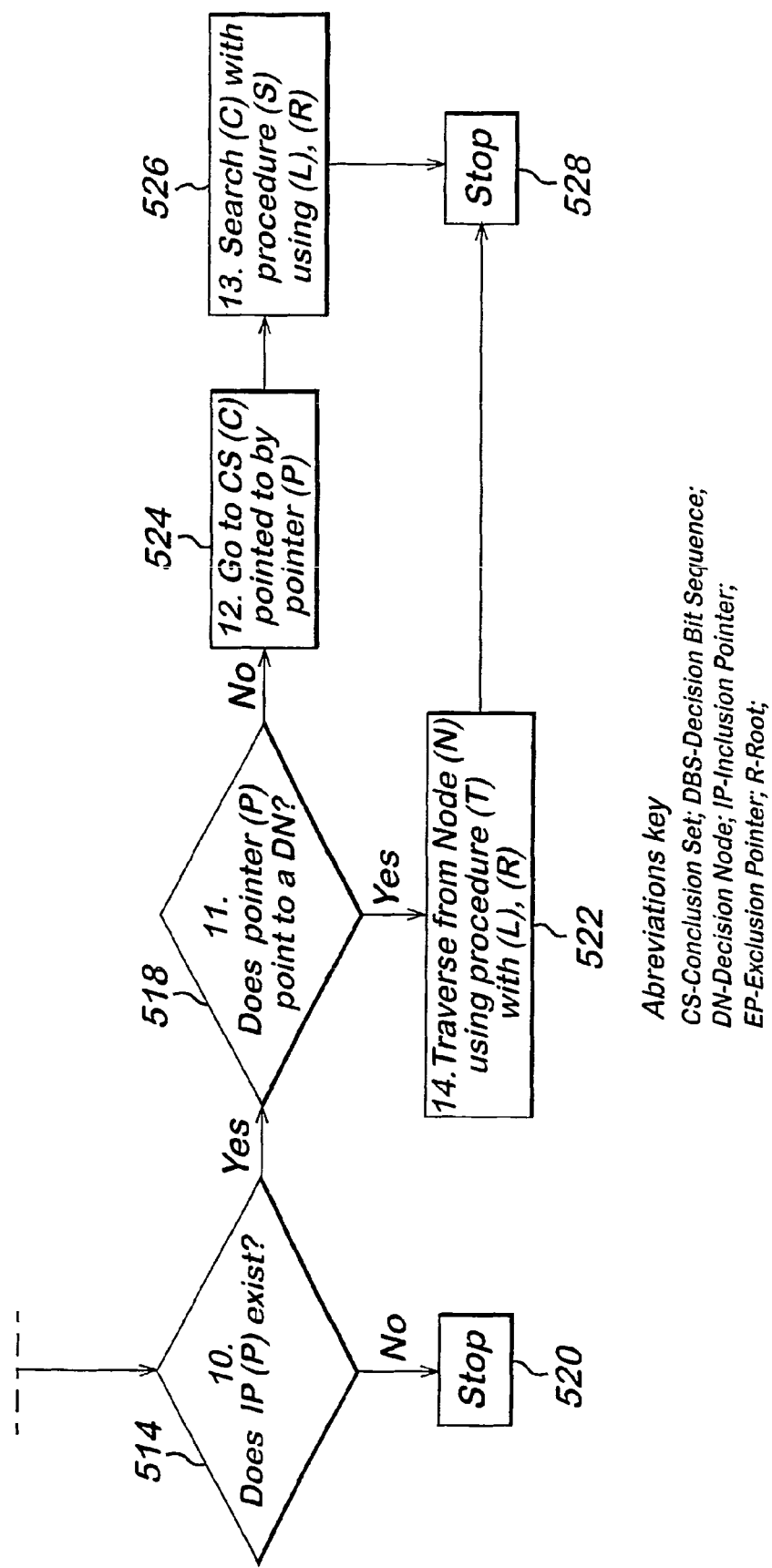
Fig. 18 (contd)

Procedure (S) for Search of Pattern List (L) in Conclusion Set (C) Returning Result (R)

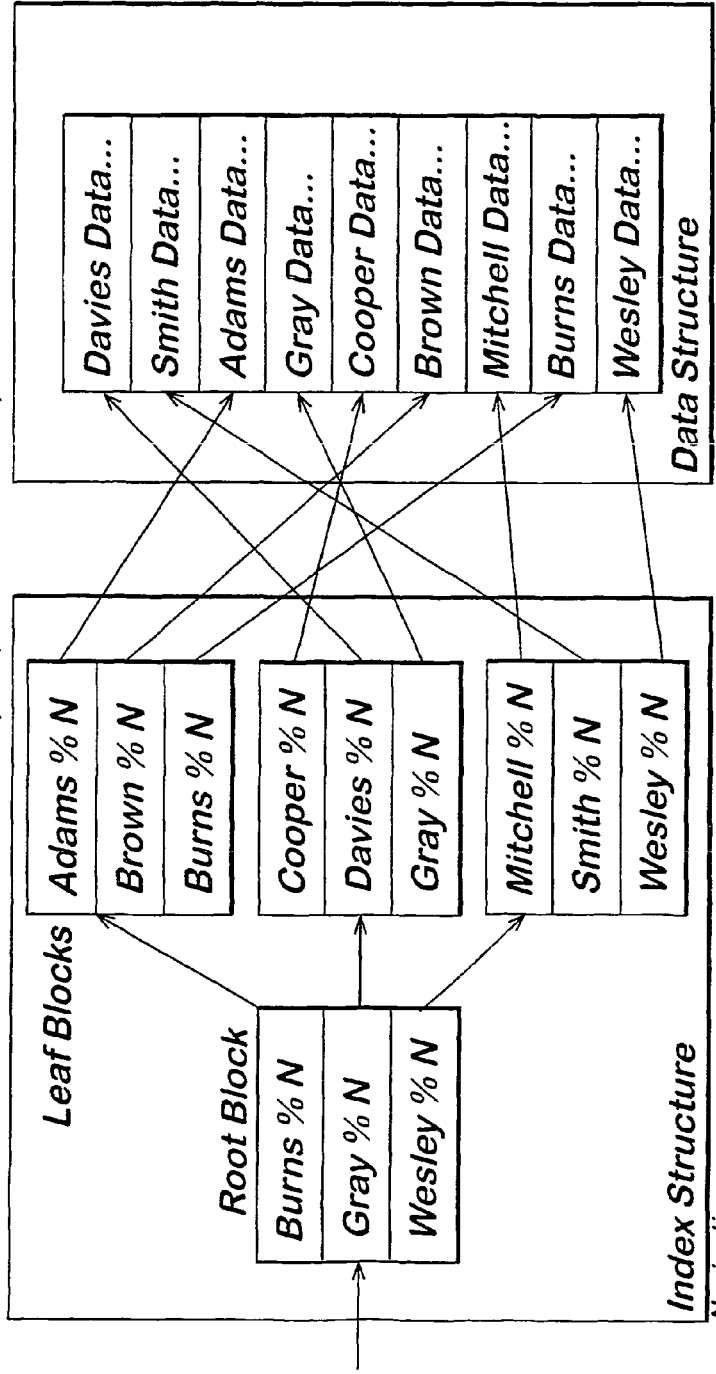

Navigation
1. The Age Base records the date/time of the most recent insert or update.
2. The Entry Age (0..255) records the age of the entry relative to the Age Base in Age Units. A zero value indicates a recent entry; and 255 indicates an obsolete entry whose space may be re-used for a new entry.

DATABASE

The present invention relates to a method of indexing, placing information into, and querying a database. In particular the invention allows efficient searching of scalar data within a data storage system.

Scalar data types include, for example, logical data, text strings, numeric data, and date-time data.

Although data processors are fast, it is inefficient and time consuming to search through all the data held in a storage system to find a particular item having a specified property or a range of properties. Also, it is almost inevitable that the data will be stored in mass storage media, and this gives rise to delays due to disk access compared to CPU speed and access to semiconductor memory. It is more efficient to create an index such that items can be retrieved using a search key.

Index mechanisms require the creation and maintenance of an internal index structure. The navigation and maintenance of this structure incurs a processing overhead in its own right. The overhead can vary as a function of the indexing mechanism used. It can also vary as the size of the database changes or as, for example, the data in the database changes from time to time.

A simple example is in a database storing chronological information, such as dates of birth. The designer may, for example, structure the data such that those people born before 2000 AD have data relating to them segregated from those born after 2000 AD. This strategy may work for a while but, it can be seen that the number of people born before 2b00 AD is a constrained set, whereas the number born after this date is unbounded. Thus, as time passes this indexing key may become redundant as the proportion of entries relating to people born after 2000 AD increases.

The effectiveness of the indexing method can be judged against a number of attributes, such as:
1) The size of the index. Larger indexes require more time to navigate. They may also require an increased number of data swaps or read operations involving transfer from mass storage media, such as hard disk drives, and faster memory, such as semiconductor memory.
2) The structural constraints of the index. A highly constrained structure may offer initial advantages, but suffers increased computational overhead if it is required to rebuild the index as the database grows to accommodate more data.
3) The key data restrictions imposed by the index. Thus, the maximum size of the keys or the data types of the keys or ranges represented by the keys may begin to effect the performance of the index as it grows or as the database becomes populated with data.
4) The key retrieval restrictions imposed by the index. Some indexes only allow exact key matching, whereas others allow range matching.
5) Growth limitations on the index. The index may be constrained by a maximum size.
6) Concurrency limitations. The index may either allow or inhibit simultaneous insertion and retrieval of key data.

Known prior art systems typically use tree graphs with nodes containing one or more items of key data. In order to interrogate the database the trees are navigated by comparing key values at each node visited with a required search key. It is inherent in such a design that each node includes the entirety of a key associated with the creation of the node and hence the "size" of the node in data storage terms can be quite large.

The efficiency of such indexes can be dependent upon the key size and the order in which data is added to the index.

Furthermore, some methods require the trees to be "balanced" at all times if they are to operate properly. These methods can incur significant maintenance overheads for key insertion and deletion making them unsuitable for high throughput systems.

Navigation

According to a first aspect of the present invention, there is provided a method of organising a database having an index and data, wherein the index is queried using a search key comprising at least one symbol, the at least one symbol represented by a plurality of bits, in order to locate data matching the search criteria, characterised in that the index is a hierarchical structure of decision nodes, the structure of nodes being navigated during a search until a conclusion is reached, and the structure is organised such that key symbols are not stored at a node in the structure, and each node has less than three exit paths.

It is thus possible to provide an efficient index structure that enables efficient search and update of the database. The index structure is much smaller than prior art indexes because the nodes do not store the whole of the key associated with the node. Indeed a node need not store any key associated with it. Furthermore the nodes do not store the decision rules relating to interrogation of a node. This is because the rules are global in that they are shared by all nodes rather than being node specific.

Each decision node makes a binary decision. That is, each node only has a maximum of two exit paths.

Preferably the decision applied at each node is a simple query. By that it is meant that the query compares the key or part of the key with the decision criterion at a node, and that in binary terms the test is typically (though not necessarily exclusively) is the key, or part thereof being tested, greater than or less than the decision criterion. This removes the need to store features of the search key within the structure of the index itself.

Each exit from a node may point to a further decision node, a conclusion set or to a null result.

If an exit from a node points to another node, then the search continues. However, if the exit from a node points to a conclusion set then the navigation of the index is generally concluded.

It is possible that no results will match the search terms, in which case the search ends at a null result.

Every "record" in the database belongs to a conclusion set. The conclusion set itself points to the data that satisfies the specific search criteria, or in some circumstances may store the data itself.

The hierarchical structure of decision nodes may be regarded as a decision graph The decision graph may be of any arbitrary size and internal structure. However, the decision graph is generally a small entity in terms of its size in a memory of a processor.

Preferably the decision graph is, in use, held within electronic memory of a data processor. By holding a relatively small decision graph in RAM, the data processor can quickly find the result of the query. In particular since the analysis of the decision graph does not require access to magnetic or other physical storage media, access times associated with such media are eliminated thereby enhancing performance.

Preferably each conclusion set can only be reached by one single route through the decision graph. This ensures that all the keys in a conclusion set conform to a shared unique set of decisions.

Database indexes can, and indeed must, evolve with time and this can lead to degradation in performance as the database grows. It is therefore necessary to allow for insertion and deletion of data within conclusion sets, and also for the creation of new conclusion sets.

Preferably each conclusion set has a maximum size. The maximum size is a user or designer controlled parameter. However, the size may advantageously be related to the size of data or addressing blocks used by a storage device, such as a magnetic store which may comprise one or more hard disks. However any random access data storage may be used, such as optical storage devices.

As a conclusion set approaches or reaches a predetermined size, a new decision node is inserted into the decision tree and the data which was in the conclusion set is re-indexed into new conclusion sets reached via the exit paths of the new decision node. The new decision node is inserted in the exit path of a node that had pointed to the conclusion set that outgrew its maximum size.

Thus the conclusion sets are constructed to be well behaved.

The decision graph does not contain any search key data itself. All key data is implied or deduced from the structure of the decision graph. This keeps the decision-graph compact. Also, this means that the size of the decision graph is independent of the key size.

A further advantage of the present invention is that changes to the structure of the decision graph can be made, and that these changes are local. That is only one or a few decision nodes are affected by the change. This means that structural reorganisation is not a significant computational overhead.

Preferably the decision nodes are related to portions, and more preferably relatively small portions, of the key. This has the consequence that the decision graph is largely independent of the structure of the key. This also has the advantage that the decision graph places few, if any, restrictions on the structure of the key. Furthermore, the portion of the key to which a node is related does not have to follow a structured order as the decision graph is navigated. Thus, the portion of the key in question does not have to progress along the key in a monotonic fashion as the graph is navigated.

Advantageously the decision graph is structured such that the semantic order of key sequences is preserved. Thus, for example, the decision graph may be structured such that a first node or set of nodes test a first bit or a first group of bits in a search key and that, as the decision graph is navigated towards a conclusion set, the bits of the key that are tested at subsequent nodes become increasingly less significant. Thus the decision graph can be navigated to locate keys either by exact matching or by range matching. The range may be partially or fully bounded during the search.

The structure of decision graph, and in particular the fact that changes to the structure are local, in that they only affect a node or two, rather than being global means that the computational task of maintaining the decision graph is generally low. The localised nature of the reorganisation facilitates insertion, deletion and retrieval of data using the index. In fact, two or more of these events may occur concurrently.

Preferably there is no functional limitation to the size of the decision graph. The structure of the index gives rise to a well behaved increase in search time as the decision graph grows to accommodate increased amounts of data.

According to a second aspect of the present invention, there is provided a database having an index, and arranged to hold data and to allow the data to be located by interrogating the index using a search key, the key comprising at least one symbol, the or each symbol being represented by a plurality of bits, wherein the index is a hierarchical structure of decision nodes, the structure of nodes being navigated during a search until a conclusion is reached, the search criterion of each node being encoded by the position of the node within the index, and each node having upto two exit paths.

The localised structural changes in the index facilitates concurrent insert, delete and retrieval events within the index.

Preferably each item of data within the database can belong to only one conclusion set.

Decision Graph Splitting

In spite of the strong preference that the decision graph should reside wholly within semiconductor memory this may not always be possible. This may be because the index becomes too large, or it may be because the host data processor implements a "virtual machine" environment for the database such that the host can multitask, and the operating system does not allocate sufficient memory resource to the database.

Under such circumstances the decision graph can be held within blocks of memory on the mass storage device of the computer system. The disk controller manages the disk in terms of discrete blocks of data. Thus, for example, if the minimum block size used by the disk controller is 64 Kbytes, then a 40K index and a 60K index both occupy the same storage space on the disk, namely one block, and similarly a 65K index and a 130K index also occupy the same storage space, namely two blocks.

In order to accommodate and work with these system constraints the modification of the index needs to be controlled since the size of the index will increase as the key population within the index increases. Thus to grow the index more blocks of memory are required.

In a first scheme for growing the index when it is required to insert a new decision node and the block is full, a new block is created and the new node is placed in the new block. The decision graph is amended such that the node that points to the new node also causes the new block to be fetched from the magnetic store if that block is not already resident in semiconductor memory. Navigation then continues from the new node.

This method is simple but inefficient as it is likely to lead to the creation of many, possibly hundreds, of nearly empty memory block from each parent full block. This may not be considered to be a problem in terms of space taken as disk drives can hold phenomenal amounts of data, but it may compromise index performance as more disk I/O operations are required to navigate the index.

A preferred approach is to create a new block and then to split the parent block (i.e. the full block) substantially equally between the two blocks. This approach does require that the original block be interrogated to find the node that best divides the block into two. This might be done from an ab-initio analysis of the nodes in the block or by approaches which are more statistical in nature. Thus, for example, a recursive algorithm might be used which repeatedly picks a test node for the split, calculates the division of the index resulting from the choice of node and on the basis of the result modifies the choice of test node until an approximately even distribution is achieved.

This second approach has the benefit that each index block contains a substantial population of nodes. This leads to a significantly more efficient use of memory.

Pattern Matching.

As noted hereinbefore, prior art systems store the entirety of a search key associated with any given mode.

The first and second aspects of the present invention disclosed a tree structure where the nodes do not store the search key but the key data is inherent in the structure of the tree.

According to a third aspect of the present invention, there is provided a method of interrogating a database having an index and data, and wherein the index is queried using a search key in order to locate data matching the search criteria, characterised in that the index is a hierarchical structure of decision nodes, the structure being navigated until a conclusion set is reached, and wherein a node may contain a sub-sequence of a key, against which a candidate key can be compared in order to determine an action to be taken, and in which the portion of the key stored at a node in an N+1th layer of the index is unrelated to the portion stored in the preceding node in the Nth layer.

As used herein, the portion of the key at an (N+1)th node is unrelated to that at the Nth node in the sense that the key portion is not calculated by selecting successive parts of the key in a nominally varying manner.

It is thus possible to provide a database wherein the decision nodes can be maintained relatively "small" since each node only stores a sub-sequence of a key rather than an entire key. This structure facilitates data base navigation, insertion and retrieval by pattern matching.

According to a fourth aspect of the present invention, there is provided a database having an index and data, and wherein the index is queried using a search key in order to locate data matching the search criteria, characterised in that the index is a hierarchical structure of decision nodes, the structure being navigated until a conclusion set is reached, and wherein a node may contain a sub-sequence of a key, against which a candidate key can be compared in order to determine an action to be taken.

Enhanced Pattern Matching

Within the process of pattern matching, it is evident that the computational load in pattern matching is a function of the length of the pattern that is to be matched, and in particular that testing the match for a short character or symbol string is less computationally expensive than matching a long string.

Furthermore the database/index efficiency also depends on how well the key population is divided at each node and how likely a sequence will appear within a query.

This is best illustrated by considering two rather extreme examples. Supposing the index is organised by name of clients and other entities that a business may wish to correspond with.

A pattern matching sequence that appears often will not sufficiently reduce the population of keys scanned during an index query. Thus, for example, if the sequence used in the pattern matching is "E", then given that this is likely to occur in most keys, it provides little help in dividing the key population.

As a further extreme example, a sequence which occurs infrequently will also not reduce the population of keys that have to be scanned in most queries. Thus, for example, "ZZ" is unlikely to appear in a query and so is not a good candidate for a pattern matching query.

As noted hereinabove, the more characters involved in a sequence, the less likely it is that the sequence will appear in a key. Thus a single character is likely to appear in a key with many characters whereas a specific sequence of four characters is much less likely to appear.

In an ideal case, the query string would divide the population of keys reached from a node substantially evenly.

A problem with the ASCII character set is that it is often difficult to find a suitable sequence using the full 255 characters in the set as there are many characters but the likelihood of some characters appearing is much greater than that of many other ones of the characters.

However, combinations of dual characters can be rare.

According to a fifth aspect of the present invention there is provided a method of storing a key or part thereof in an index of a database, wherein the elements of the key are mapped from a first set constituting a list of at least some of the values that the elements can take to a second set smaller than the first set.

Thus the number of different characters that can occur in the key is reduced. The mapping is not unique but if the mapping is appropriately selected the likelihood of any single character of the second set occurring can be reasonably high and combinations of two or more characters can be used for sequences.

Preferably the mapping is applied to the key prior to navigation of the decision graph for insert, delete or query operations.

Advantageously either the original key value or the converted key value (which is smaller in terms of the space required to store it) can be stored in the conclusion set.

According to a sixth aspect of the present invention, there is provided a database in which the keys are mapped to a reduced range of values prior to index navigation.

Key Compression.

As noted hereinabove, some prior art databases store the full decision/search key at each decision node. This can create a relatively large index structure given that the keys can themselves be large. It has also been noted that in a database constituting an embodiment of the present invention, the search keys do not need to be stored at each decision node, although it may be desirable to store a portion of the search key at a decision node. The option to store portions of the search key still results in a relatively compact database decision tree which can be navigated rapidly. However, the inventor has realised that the key does not need to be stored in the index in its native form. Thus the key may be encoded into a form which takes up reduced space.

According to a seventh aspect of the present invention, there is provided a method of encoding keys within a database, wherein key data is stored in at least one conclusion set in an encoded form so as to reduce the storage space requirements of the keys.

It is thus possible to provide a more compact conclusion set. The data base supports exact matching.

It is important that the mapping function is well behaved, that is, that when the mapping function is applied to a particular key, it always returns the same result.

However, it is not necessary that the mapping is unique. Indeed where the mapping algorithm gives a high degree of compression it becomes highly unlikely that the mapping will be unique.

Advantageously at least two dissimilar mapping algorithms are used. The use of dissimilar mapping may be restricted to use in the conclusion sets.

Known and published mapping algorithms, such as, for example CRC32 and Adler 32 may be used to implement the mapping functions.

Preferably the mapping function is arranged to return a value from a range of positive integers (including zero) whose size is at least as large as the population of distinct keys held within the index. Thus each key has the potential to be mapped by the algorithm to another value and no keys are too long.

For example the mapping can be calculated from a scalar of length N bytes using the following function:

$$[(K^O \times 31^{(N-1)}) + (K^1 \times 31^{(N-2)}) \ldots + K^{N-1}] \text{ modulo } R$$

Where $K^N$ is the $n_{th}$ byte value (0.255) of key K

R is the smallest power of 2 greater than the size of the population of distinct keys held in the index.

Suggested values of R are $2^{16}$ for indexes containing less than 65000 keys.

$2^{32}$ for indexes containing less than $4 \times 10^9$ keys.

$2^{64}$ for indexes containing less than $1.8 \times 10^{19}$ keys.

Advantageously the key information stored at a conclusion set may be the conventional key as stored in prior art system, or preferably is a further encoded version of the key where the mapping function applied is different to the function used to encode keys in the decision graph.

Qualifier

An index query can lead to many key hits. Each result returned from the query may result in a retrieval of the associated data from a mass data storage device. Since this is typically a hard disk, then a disk I/O operation may be required for each result returned from the query.

Not all of the data fetched may be required.

Consider for example the case of a multinational organisation which wishes to query its personnel database in order to determine the number of employees based in London and within a specific salary range. An index based only on location or on salary might return many employees for a given query. It is only the resulted of the ANDed enquiry that reduces the query size.

It is known to modify database indexes for this type of query by storing more than one key in the index. Thus the key can be regarded as a compound or composite key. The chances of a candidate (i.e. an entry in the database) matching two keys is much reduced compared with the chances of a candidate matching one key, then the number of hits returned by the query is reduced and fewer disk I/O operations are required.

It is known to make these composite keys by concatenating keys together. Put simply the second search criteria is added to the first at the time of index creation. However, the individual keys may be quite lengthy and producing an index of concatenated keys can result in the index becoming very large indeed.

The applicant has realised that key data need not be stored in its original form but can in fact be encoded or represented by a word or bit sequence of significantly reduced length. The first key in the index, and every subsequent key in a concatenated key can be represented in such a modified form.

According to an eighth aspect of the present invention, there is provided a method of organising a database, wherein the index key is a composite key containing at least one key, and in which one or more keys are represented in a compressed form.

Preferably a plurality of keys are provided in compressed form.

Preferably the keys are compressed by mapping them from an uncompressed form to a compressed form. The mapping need not be unique but must be well behaved. Suitable mapping can be performed by the use of hashing algorithms.

There is, by the very fact that different keys can be represented by the same reduced representation, a risk that a query will return both results that do match the query and some results that do not match the query. However, assuming that a good randomising Hash encoding is used, the probability of a mis-match on one key is 1/255, but for N qualifiers the probability of a mis-match is $(1/255)^N$.

Thus, the error rate is generally small.

Advantageously all hits returned are inspected so as to validate the data and remove any wrongly returned results.

When performing insertion, deletion or retrieval, the new key must be compressed using the same key translation process as was used to build the index.

Preferably each additional element after the first element of a concatenated key can be represented as a "qualifier". Each qualifier is preferably only 1 byte long.

Thus, comparing the present invention with the prior art, a prior art concatenated key comprising eight key elements, each of eight bytes, occupies 64 bytes. In the present invention the principal key may be represented in an uncompressed format, thereby occupying 8 bytes, whilst the seven additional keys may be respectively represented a one byte qualifier. Thus the total key length is now only 15 bytes.

The qualifier keys are optional, and none, any or all of the keys may be provided during an index query because they do not affect the navigation of the index structure. The testing of hits against the qualifier keys is performed when scanning the conclusion sets.

It will therefore be appreciated that this aspect of the invention can be used with conventional database structures, such as a B-tree, or with the structures disclosed elsewhere in this application.

Additionally qualifiers can be used in conjunction with an index where the information relating to a node is inferred from-the position of a node rather than explicitly defined by or contained within the node itself (such as an index constituting an embodiment of the first aspect of the present invention).

According to a ninth aspect of the present invention, there is provided a database wherein the index contains at least one key, and in which one or more keys are represented in a compressed form.

Bounded Key

As noted hereinbefore, the efficiency of data base indexes can be highly dependent upon the key characteristics used therewith, leading to potentially inefficient indexing systems where the key value is continually increasing or decreasing. An example of such an unbounded key is the date/time key that constantly increases with current time. As these keys are added to the index, they cause new areas of the index to be created, and as the old keys are deleted from the index they may cause fragmentation where obsolete areas of the index cannot be reused for new key values. It would be highly advantageous if the index structure could be organised in such a way that the use of an unbounded key did not cause the index to become unbalanced.

According to a tenth aspect of the present invention, there is provided a method of navigating a database with a range of keys between a first key and a second key representing limits of the range, and wherein the keys mapped to a reduced range, and if the order of the keys is not preserved during the mapping a search is made of the mapped space greater than the larger of the keys and less than the smaller of the keys.

Advantageously the key is operated on by a hashing or modulo function such that the keys are substantially equally distributed throughout the database. Thus, for example, an unbounded date/time (K) (which may, for example, be the number of milliseconds since 1st January 1970) is converted to (K modulo N) where N is the chosen modulo for the index. Thus the converter key value will always fall into the range 0 to (N−1).

Preferably the modulo value applied to the keys is greater than or equal to the maximum number of distinct key values which would be held within the index. However it must be pointed out that this condition is not mandatory.

Advantageously the conclusion sets (nodes at the end of the tree index) contain the key in the unmapped form. This reduces the possibility of error since the search key can then compared with key data in the conclusion set, both in their native form, such that mapping errors can be avoided.

This invention can be applied to conventional B-tree or other indexes.

According to a eleventh aspect of the present invention, there is a database including a method of coding unbounded keys for use within a data base, characterised in that each key is processed by an operator which maps the key to a bounded range.

Transient Keys

There is sometimes a need to handle data whose validity or usefulness is limited to a certain time range, or other range of values. In prior art data bases, such "transient" data is handled much like normal data, and as a consequence it is usually necessary to explicitly delete obsolete transient key data or to remove sections of the index where such obsolete key data resides. Such operations can be very processor intensive and can incur a significance performance overhead within the database or can impose design constraints.

According to an twelfth aspect of the present invention, there is provided a method managing keys within a data base, characterised in that the keys include a data field indicating a duration for which the key and its associated data should be maintained within the data base.

Thus, some or all of the conclusion sets may be modified to include data indicating the duration for which a key and its associated properties can be considered valid.

Preferably, expired keys are not actively removed from the conclusion sets, but they become available for overwriting by new data once they have expired. Thus, there is no need to explicitly delete transient keys and hence no performance overhead is involved in a deletion process. Rather, once the marker indicates that the data is no longer valid, the space that it occupies is made available for re-use.

Although it would be possible to provide an explicit date and time marker for the data at which the information would no longer be detected within the conclusion set, this form of encoding could take up an unacceptably large amount of space. In a preferred embodiment of the present invention, the key is associated with an age unit, which gives a measure of its current age, and an age limit which indicates the age at which the data and key are no longer valid and become available for overwritting.

Preferably the age unit is a variable, whose length represents the number of seconds in a single age unit. The age limit represents the number of age units after which a key may be removed from the index.

Advantageously each conclusion set contains an age base which is a date/time stamp of the most recently inserted/updated entry in that set. When the conclusion set is accessed, the age of each entry is calculated, and advantageously the results of the calculations are stored in an entry age field. A comparison may be made between the entry age and the age limit to determine when the entry can be overwritten.

Determining the Duplicity of Scalar Data

As noted hereinbefore, prior art (B-tree) decision graphs are navigated down to leaf blocks that hold the key value and pointer information. Navigating the decision index may require one or more disk input/output operations to find a chosen key. If the index is used to record the existence of unique key combinations, where duplicate combinations are frequent, then the disk structure of the index may be inappropriate for a high performance system.

According to a thirteenth aspect of the present invention, there is provided a method of organising a data base such that it has a decision index and a key index, wherein the keys in the key index are stored in a compressed manner, and wherein a check may be made of the key index to see if the key exists prior to interrogating the decision index using the key.

It is thus possible to provide an efficient memory base method for determining the existence of a key with an index, such that the need to search the index itself directly for the key can be avoided.

Thus the invention effectively compliments a standard index structure by holding encoded key values in semiconductor memory. The existence of a key is checked to memory prior to searching the index. If a matching entry is found in memory, the key is rejected as a duplicate, otherwise an attempt is made to insert the entry into the index.

In order to provide an efficient and compact structure, the key index uses a one way mapping function, such as a hash function. The features of the hash function or other mapping function are such that;

Whenever the mapping function is invoked on the same key value more than once, the mapping function must consistently return the same value provided that no information within the key has been modified;

If two keys are deemed equal, then calling the mapping function on each of the two keys must produce the same result;

It is not required that two unequal keys are mapped to dissimilar values, however, providing distinct results for unequal keys will improve the efficiency of the index.

Published hash code algorithms, such as CRC 32 and Adler 32 may be used as they provide suitable functionality.

In an implementation of the key index, the memory may be arranged as a homogeneous array of four byte elements. This array is known as the identity array. Preferably the number of elements in the identity array is 1.1 times or more the number of unique key elements held within the index structure. However, it follows that it is merely sufficient for the identity array to be at least as large as the index. Two hash functions, A and B, are used in conjunction with the array. The functions are selected such that;

For any two unequal keys, K and L, where $A(K)=A(L)$ it is unlikely that $B(K)=B(L)$.

For any two unequal keys K and L where $B(K)=B(L)$, it is unlikely that $A(K)=A(L)$ The hash function A is used to calculate the offset element (0 ... N) in the identity array for the key K using the following equation:

$$\text{Element number} = ABS(A(K)) \text{ modulo } N$$

Where ABS( . . . ) returns the unsigned magnitude of a number and N is the number of elements in the identity array.

This function is known as the element function $E(K)$.

Each element in the identity array stores $B(K)$ where the element offset is given by $E(K)$. A key $(K)$ is deemed duplicate if the element at offset $E(K)$ contains $E(K)$. If the element contains any other value, the index structure must be searched to determine its duplicity.

For an attempt to insert a key K into the index the following sequence of events occurs. Firstly $E(K)$ is calculated. Then $B(K)$ is calculated. If the element at $E(K)$ in the identity array contains $B(K)$, then the insert is rejected as a duplicate K. However, if the element at $E(K)$ in the identity array does not contain B(K) then the element is overwritten with B(K) and a search is made of the index to determine if the key is a duplicate.

The use of an identity array considerably reduces the storage area required to hold the list of the keys. If a data base had one million entries, and each key was 32 bytes long, then it would require over 32 Mb of memory to cache the index in memory. However the equivalent identity array would only occupy 4.4 Mb of memory.

Organising Indexes be Hierarchy

As noted herein, prior art indexes typically use tree graphs with nodes containing one or more items of four key data. The tree graphs (decision graphs) are navigated down to leaf blocks (conclusion sets) that hold the key value and pointer information to the stored data structure. Navigating the index may, require one or more disk input/output operations to find a chosen key. Disk access operations generally represent the highest performance overhead of the index since, in general, disk access is slow compared to memory access and data bottlenecks can occur. To mitigate this overhead, indexes are often partitioned with each partition assigned to a different physical disk, thereby allowing disk I-O's to be overlapped during index operations to increase the overall throughput of the index. This method of subdividing the index presents a flat one dimensional view of index division.

According to a fourteenth aspect of the present invention, there is provided a data base index divided in a hierarchical structure such that an index may delegate some of its workload to one or more other indexes.

Preferably a delegate index may itself delegate some of its work load to one or more other indexes.

An index participating in such a hierarchy of indexes is responsible for a range of sub keys. Where such an index is handling a sub-range of keys on behalf of another index, it is known as a delegate index, and its key sub-range is known as a key manifest.

Preferably the key manifest of an index is defined by limiting a contiguous subset of bytes within the key to a contiguous range of possible values. Any attempt to insert, delete or update or search for a key that does not conform to an index key manifest is rejected by an index, otherwise the key operation is handled by the index or one of its delegate indexes. The hierarchy may be arranged such that each index may have a zero, one or more delegate indexes, but each index may only be a delegate to one other index.

Where an index has one or more delegate indexes, an operation to insert, update or delete a key is submitted to the delegate index with the appropriate key manifest. If none of the delegate indexes have an appropriate key manifest, then the operation must be handled by the index itself.

Where an index has one or more delegate indexes, an operation to search for a key range is submitted to all of the delegate indexes with appropriate key manifests and the search is made by the index itself. The query results from the search delegate indexes are combined with the result from the index's own search. All of the queries can be performed simultaneously. It is thus possible to modify an index structure such that work can be subdivided across various sub-indexes therein. Each sub-index may point to an associated physical storage device thereby allowing multiple concurrent disk accesses to occur. This reduces the disk bottleneck and allows faster operation of the data bases as whole.

The present invention will further be described, by way of example, with reference to the accompanying drawings, in which:

FIG. 1 is a schematic overview of the present invention;

FIG. 2 is a schematic representation of the logical structure of a decision graph;

FIG. 3 schematically illustrates the structure of a decision node;

FIG. 4 schematically illustrates the structure of a conclusion set;

FIG. 5 schematically illustrates the structure of an entry in a conclusion set FIG. 6 schematically illustrates an exact search procedure.

Figure 7:
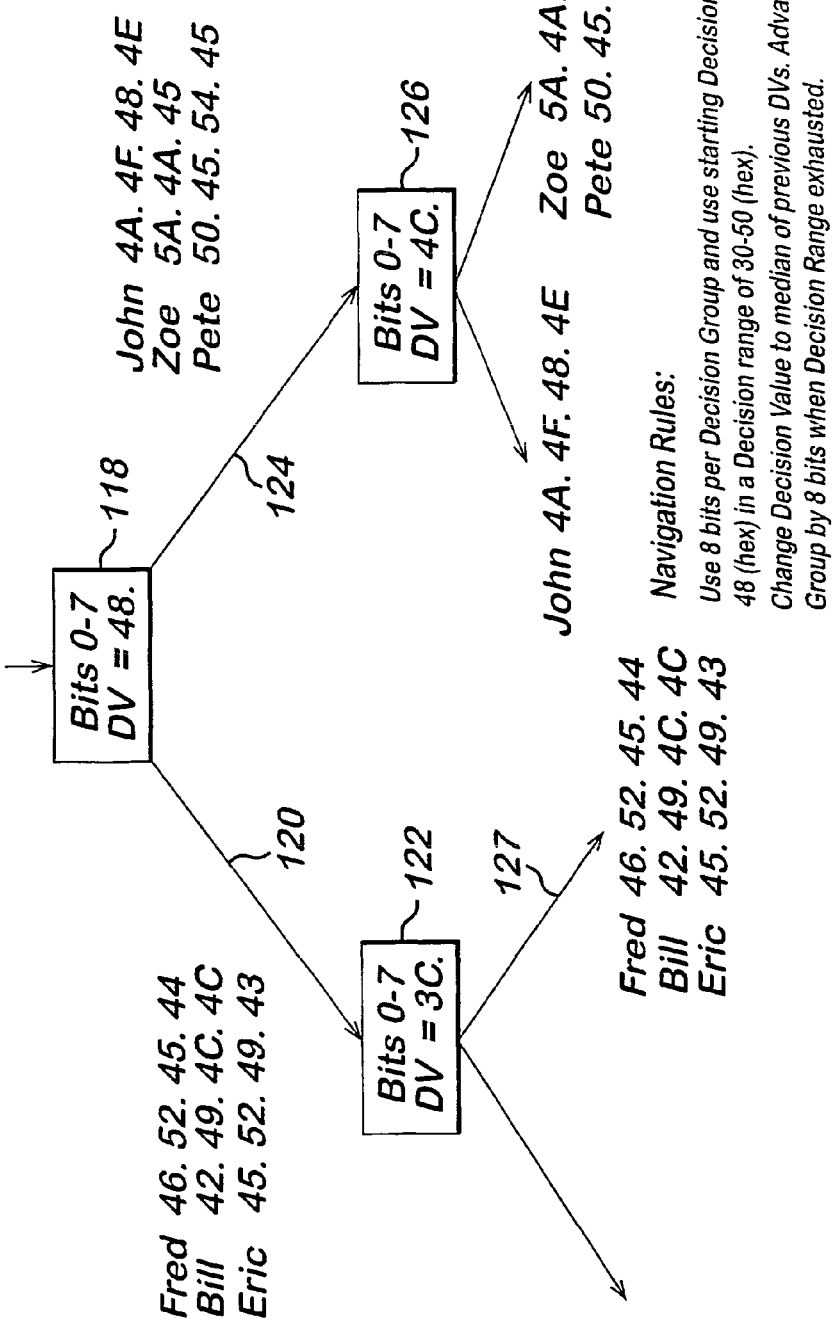

FIG. 7 schematically illustrates a range search procedure.

FIG. 8 schematically illustrates the procedure for inserting a key;

FIG. 9 schematically illustrates the procedure for deleting a key;

FIG. 10 schematically illustrates the procedure for an exact key query;

FIG. 11 schematically illustrates the procedure for a range of query; and

Figure 12:
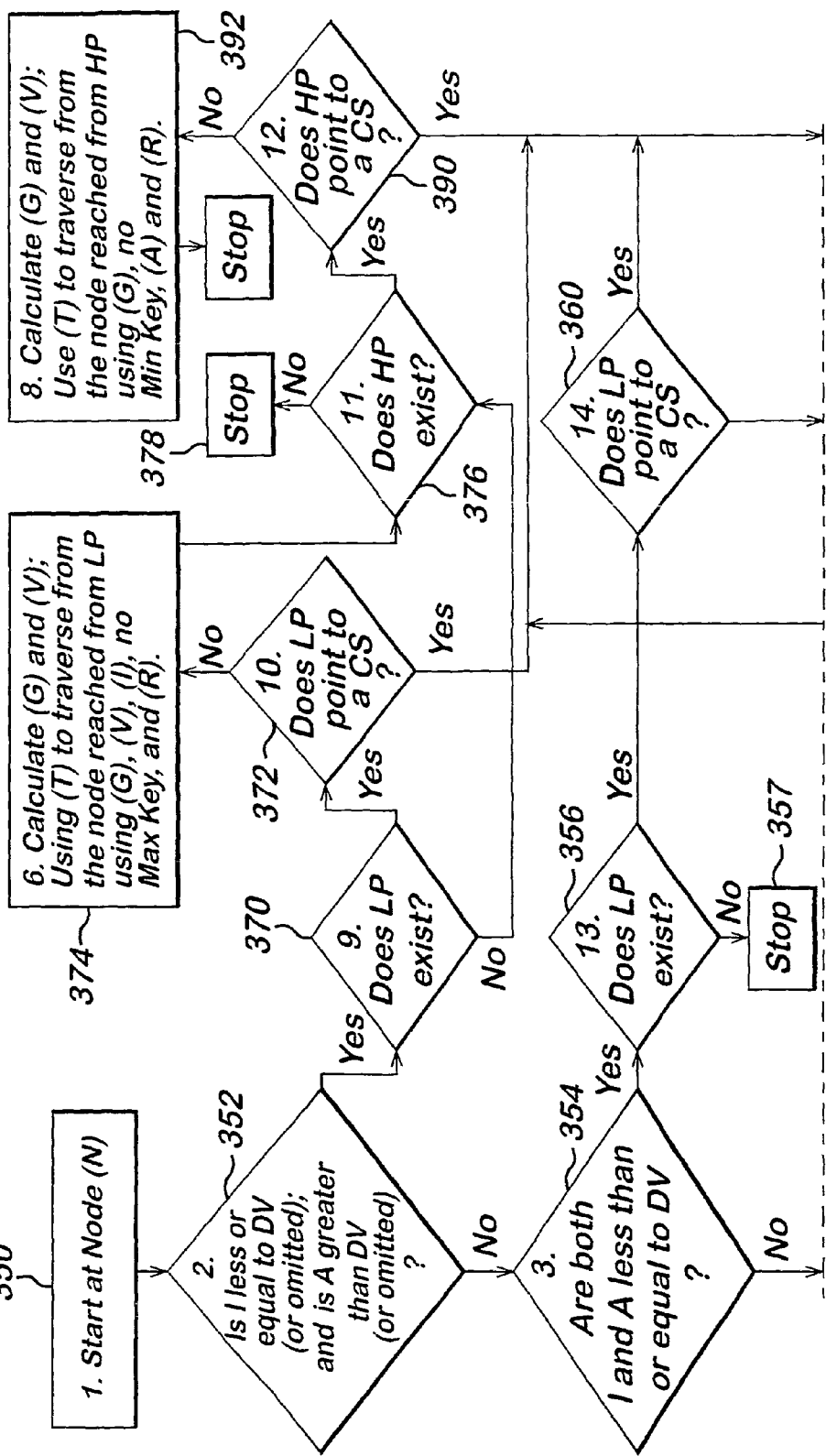

FIG. 12 schematically illustrates the procedure for traversing a node with a decision group G, decision value V, to minimum and maximum key ranges, and returning a result.

FIG. 13 shows the structure of a portion of a decision graph.

FIG. 14 shows the logical structure of a modification decision node.

FIG. 15 shows the procedure for inserting a key.

FIG. 16 shows the procedure for deleting a key.

Figure 17:
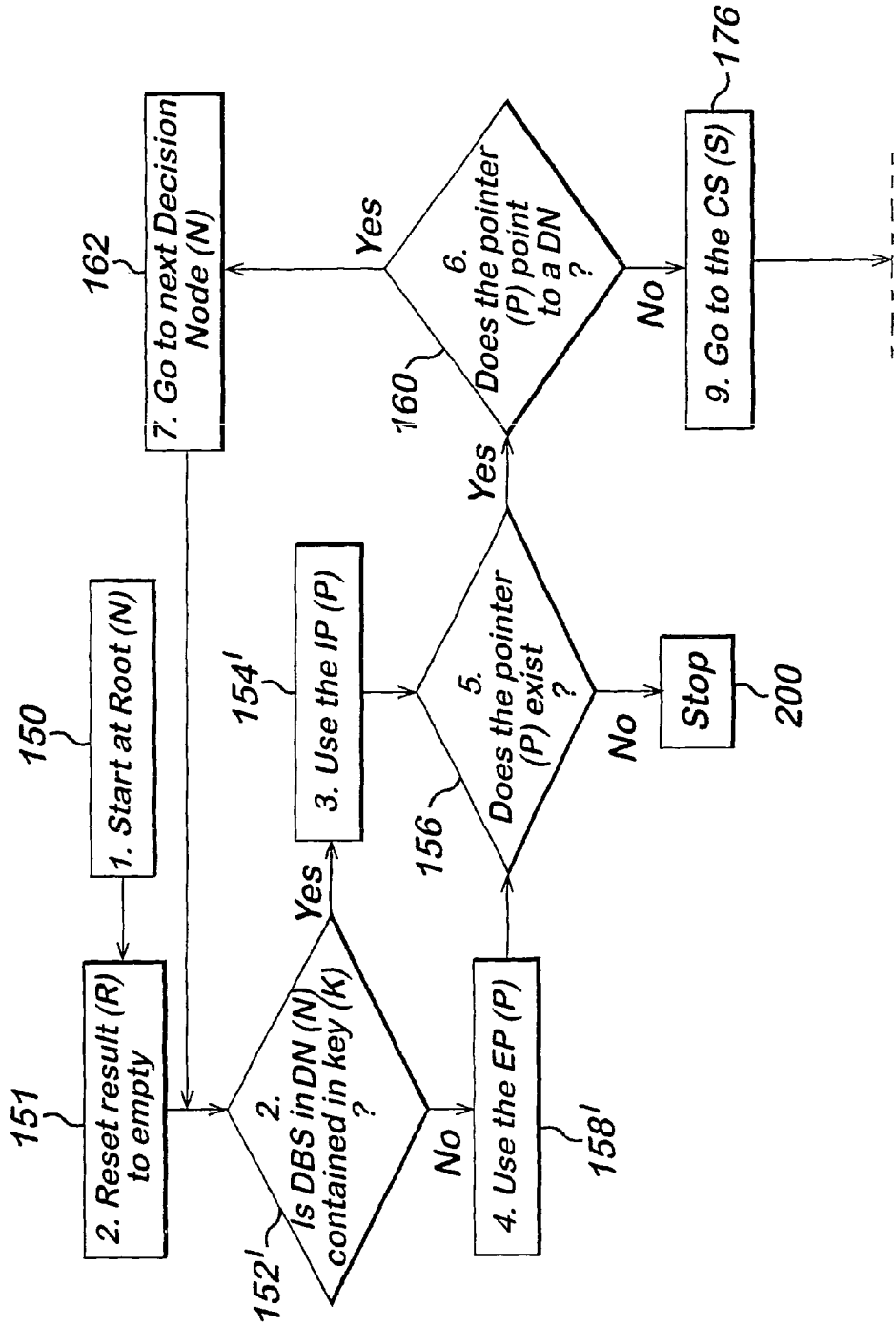
Figure 17:
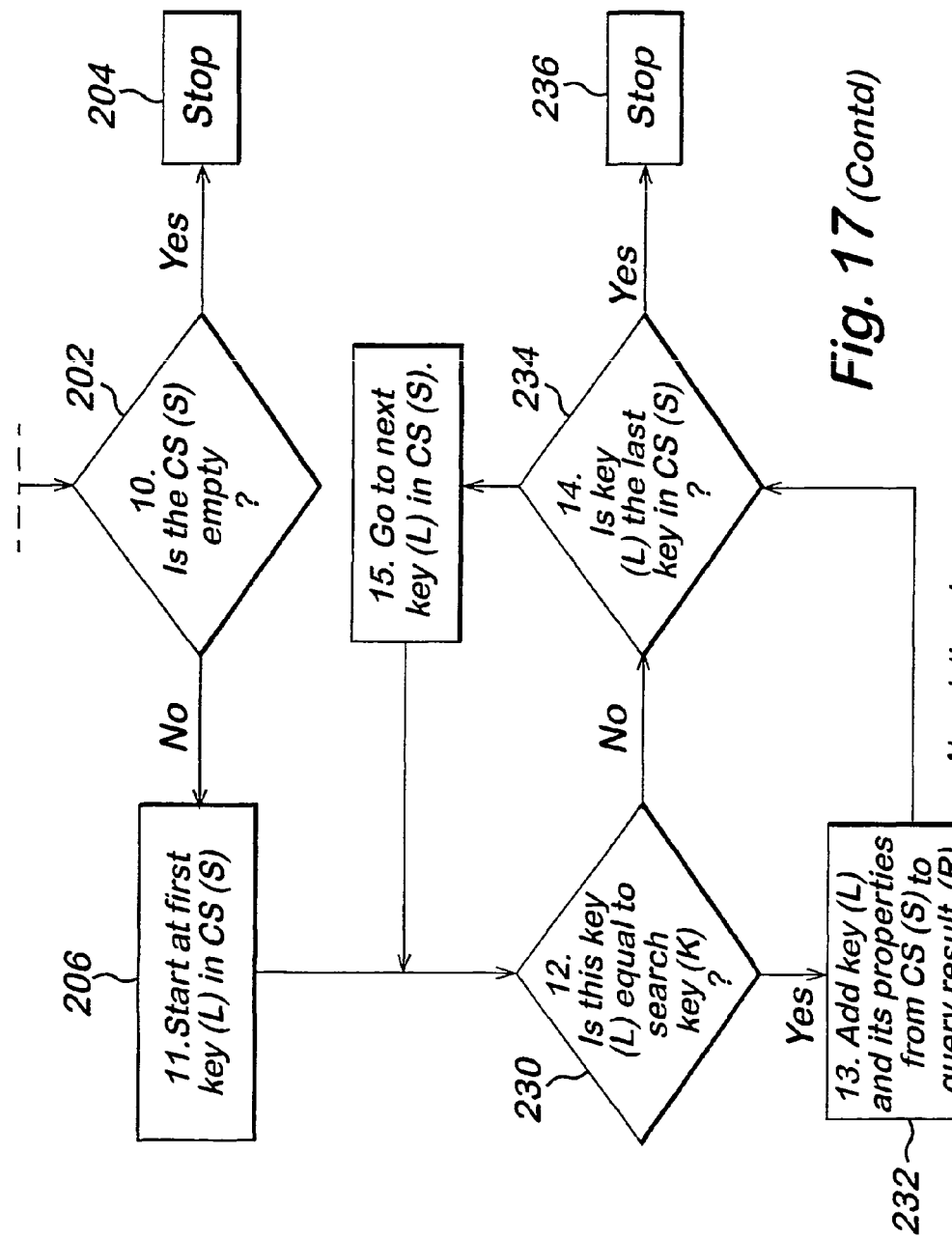

FIG. 17 shows the procedure for an exact query match.

FIG. 18 shows the procedure for traversing the tree with a pattern list and returning the result.

Figure 19:
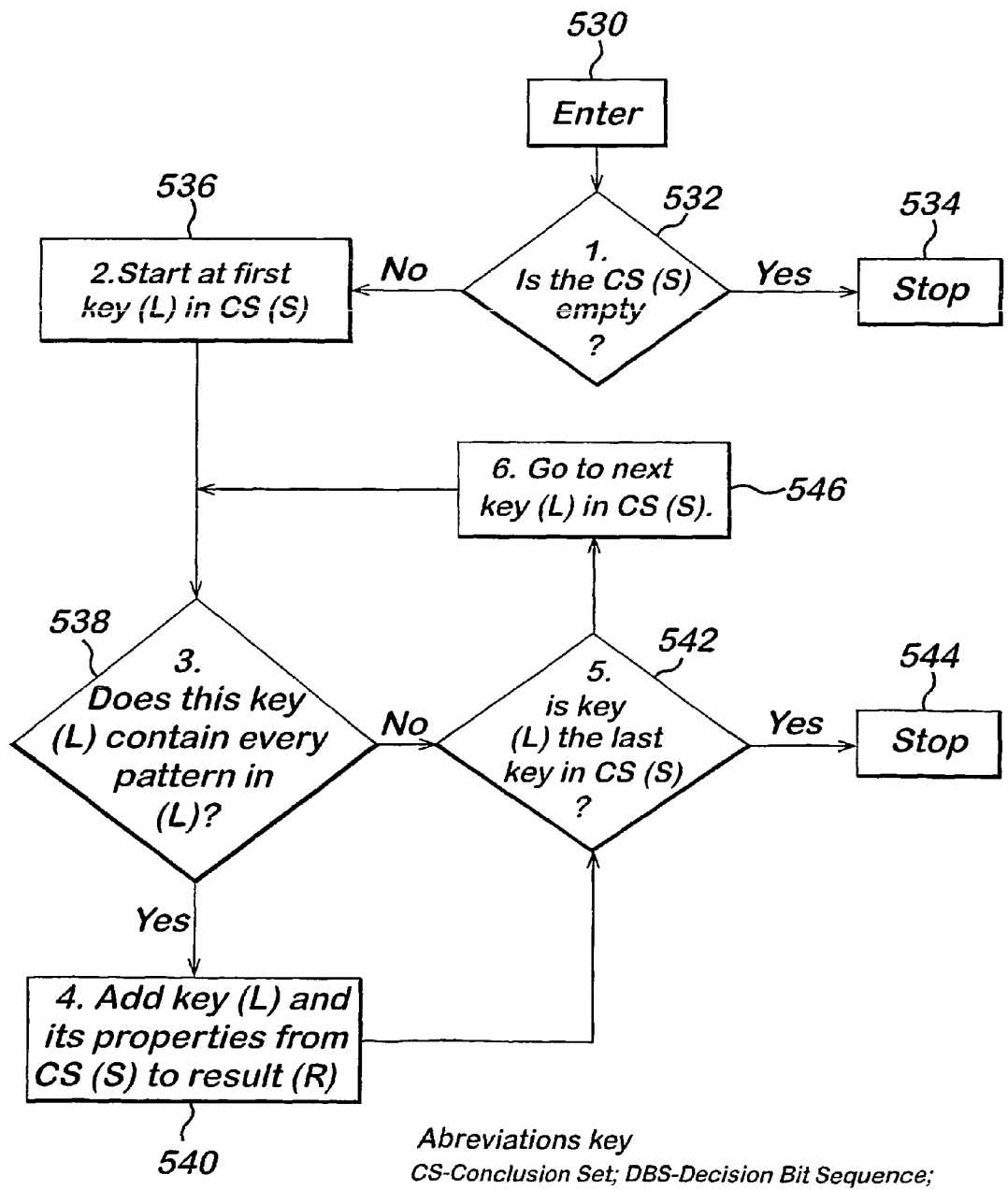

FIG. 19 shows the procedure for a search of a pattern list. (L).

Figure 20:
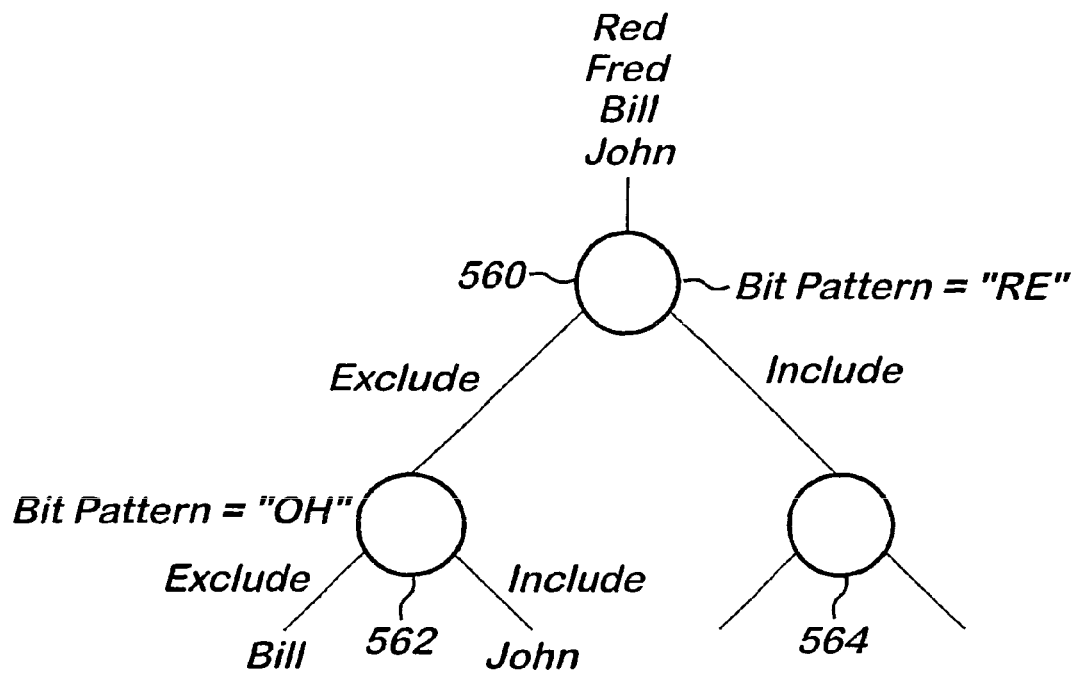

FIG. 20 is an example of how a pattern match process helps in sorting data.

Figure 22:
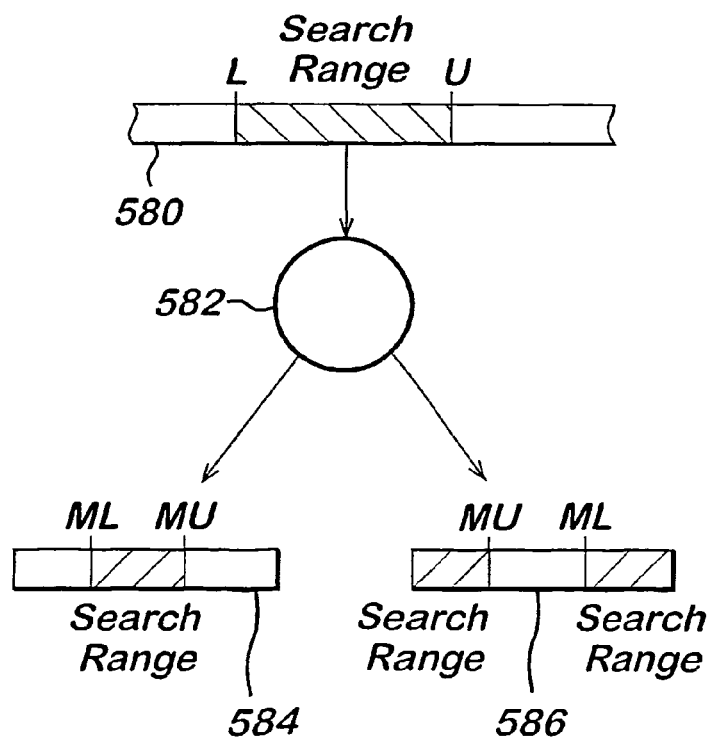
Figure 23:
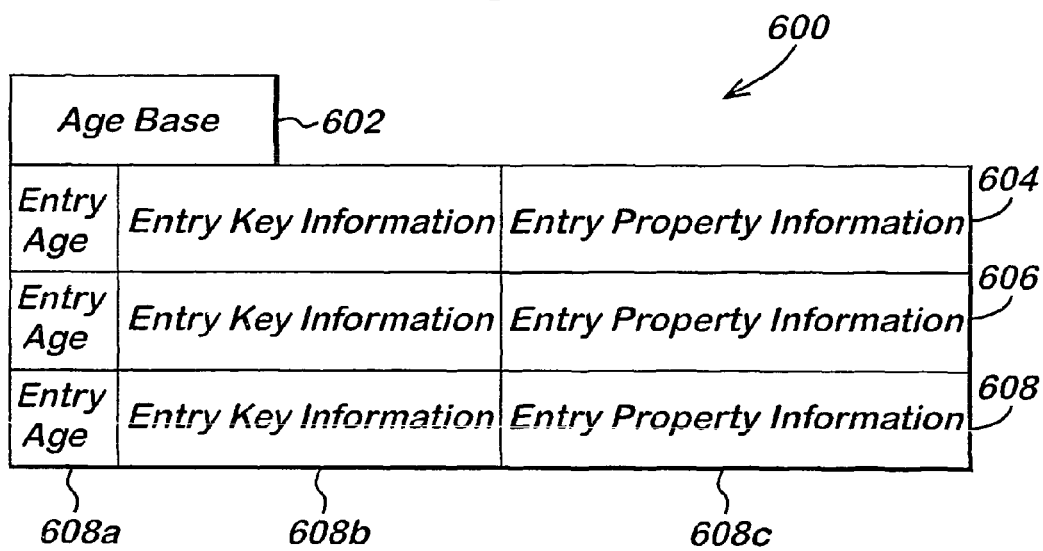
Figure 24:
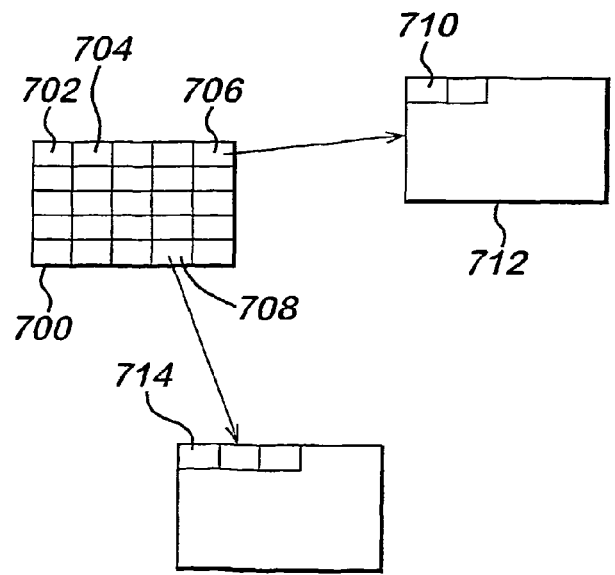
Figure 25:
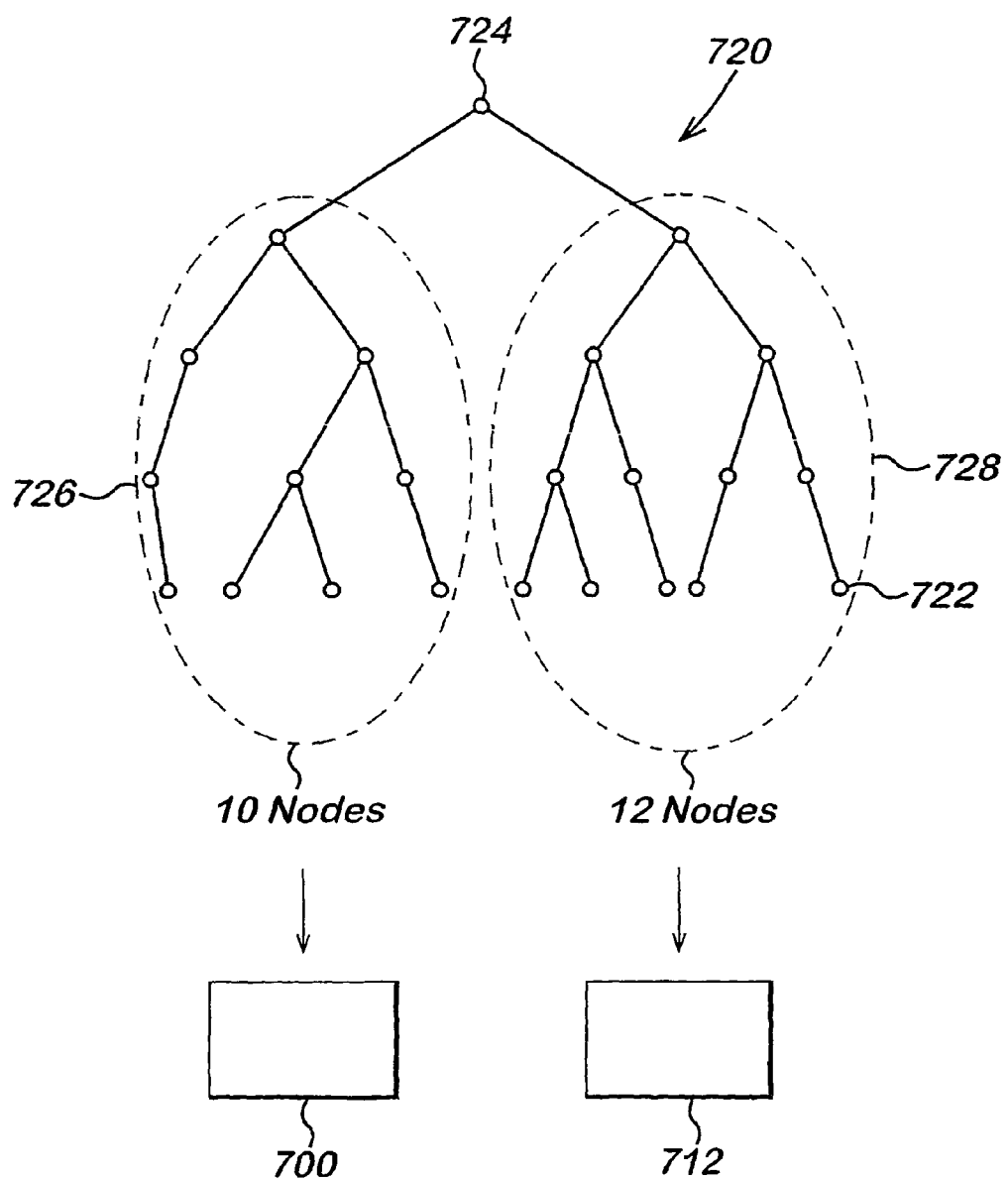

FIG. 21 is a schematic illustration of a decision graph having a bounded index;

FIG. 22 shows the structure of a modified conclusion set;

FIG. 23 schematically illustrates a first way of splitting a decision graph;

FIG. 24 schematically illustrates a second way of splitting a decision graph; and FIG. 25 schematically illustrates the configuration of a composite key having qualifiers therein.

Figure 26:
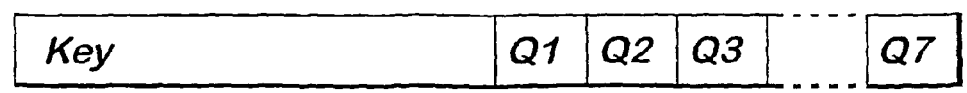

FIG. 26 schematically illustrates the format of the search key.

FIG. 1 schematically illustrates a database incorporating an index constituting an embodiment of the present invention and a data store. The index 2 comprises a decision graph 4 and a plurality of conclusions sets, 6, 8, 10, 12 and 14. Each conclusion set is reached by one, and only one, path through the decision graph. However each conclusion set then points to relevant entries within a data store 16.

FIG. 2 schematically illustrates the structure of a decision graph, generally indicated 20. The decision graph commences at an origin 22. All navigation through the decision graph must start at the origin. The origin may have zero (for example when the database is new), one or two decision pointers pointing to further nodes within the decision graph or to conclusion sets. Each other decision node may contain 0, 1 or 2 decision pointers, with each decision pointer pointing to either another decision node or to a conclusion set. The decision pointers at a decision node will be referred herein to as "the low pointer" and "the high pointer".

A decision pointer at any decision node in the decision graph can only point to either one other decision node in the same decision graph or to a single conclusion set. Any decision graph node must be pointed to exactly by one other decision node within the same decision graph or by the origin. Similarly, any conclusion set must be pointed to exactly by only one decision node within the decision graph. Thus any conclusion set can only be reached by following a single and unique path through the decision graph from the origin. This unique path in known as a navigation path.

FIG. 3 schematically illustrates the logical structure of a decision node, generally indicated 40, in greater detail. The decision node includes a low pointer type, a low pointer, a high pointer type and a high pointer. The low pointer type 41 indicates the purpose of the low pointer 42. The low pointer type 41 can indicate whether low pointer 42 points to a decision node or to a conclusion set. The low pointer 42 gives the address of the decision node or of the conclusion set that it points to. A zero value can be inserted to indicate that no pointer exists. Similarly, a high pointer type 44 indicates whether the high pointer 45 points to a decision node or a conclusion set. The high pointer indicates the address of the decision node or the conclusion set that it points to. Again, a zero value can be used to indicate that no pointer exists. This enables the "tree" like structure of the decision graph to be represented and stored with a data processor and its memory.

FIG. 4 schematically illustrates the structure of a conclusion set. A conclusion set comprises a plurality of key and property entries, 60, 62, 64, 66 and 68 each linked together by a directed link giving the address of the next entry in the conclusion set. FIG. 5 schematically illustrates the logical structure of each entry within the conclusion set. The entry consists of three fields, namely a link field 80, a key field 82 and a property field 84. The link field points to the next conclusion set entry. The zero value can indicate that there are no more entries. The key field 82 holds the exact value of a key whereas the properties field 84 holds the properties associated with that key for example the address of the data corresponding to the key field 82. Having defined the components of the index, there follows a discussion of how to use and navigate the index.

In order to navigate along the index, each decision node visited along a navigation path refers to one or a group of bits within the key; This group of bits is known as a "decision group" the number of bits in the decision group can be set to include any number of bits between a single bit and all the bits of the key.

The range of possible values taken by the decision group is known as the "decision range" and is bounded by a decision range minimum value and a decision range maximum value. The decision range minimum value may be any value less than all bits set in the decision group, and similarly the decision range maximum value may be any value greater than the decision range minimum. For convenience, minimum and maximum values may be represented in an unsigned magnitude notation system.

Each decision node has an associated decision value. The decision value determines whether a low pointer or high pointer is followed when navigating through the decision node. The high pointer is used when the value of the examined decision bit group in the key is greater than the decision value, otherwise the low pointer is used.

Comparison of the decision value is advantageously performed using unsigned magnitude notation. The decision value can be set to any value chosen by the system manager, designer or operator, but advantageously is selected from one of the following:

1. The mathematical median of all possible values of the decision group.
2. The mathematical median of all the expected values of decision groups.
3. The mathematical average of all the expected values of the decision group.
4. An arbitrary value specified at the time of creation of the index.
5. The median of the current decision value (ie the most recently used decision value) and the decision value preceding it.

The selection of a decision group at a visited decision node can, advantageously but not necessarily, be based on one or more of the following:

i. The decision group may be the same for all the decision nodes.
ii. The decision group may be changed on every visit to a decision node.
iii. The decision group may be changed when the decision value from the previous decision node reaches or approaches the decision range maximum or decision range minimum of the current decision group.
iv. The decision group may be changed when the decision value between successive nodes would change by less than one unit or by less than some other predetermined threshold.

The size of the decision group at a decision node may be determined on the basis of one or more parameters. The size of a decision group may, for example, be fixed for all decision nodes. However, the size may be increased from the previous decision group when a new decision group is selected or, alternatively, the size may be decreased from the previous decision group when a new decision group is selected.

The position of a decision group, relative to the key, at a decision node can be based on one or more of the following. The position of the decision group may be fixed for all decision nodes. Additionally and/or alternatively, the position of the decision group may be a fixed offset from the previous decision group when a new decision group is selected.

Advantageously further constraints may be imposed if the index is to support key retrieval by range matching. In particular the most significant bit must be included within a hierarchically significant node, such as the origin. Then the significance of the decision group within the overall key should then be changed in a monotonic manner of decreasing significance.

It is advantageous to consider some examples of how the index may be navigated. FIG. 6 shows how a four byte key can be navigated in an exact match search. In this example the keys are stored in ASCII coding and the numbers shown against each key show its value in hexadecimal notation. In this example, each decision group has a fixed size of four bits. The decision group is moved sequentially down to the next four less significant bits at each new node visited. In this example, the most significant bit is designated zero, the next most significant bit is one, the next most significant two, and so on. Furthermore, for simplicity, the decision value applied at every node is four. Thus, if the decision group has the value zero, one, two, three or four the graph is traversed to the left. However, if the decision group has a value of the range of five to fifteen the graph is traversed to the right.

As shown in FIG. 6, a number of names are presented to the database. These names or key values, are Fred, John, Bill, Zoe, Eric and Pete. The hexadecimal equivalent of each key is located adjacent the name. The navigation process that will be described is suitable for insertion, deletion or matching.

Initially the keys are presented to a first decision node 100 at which bits zero to three are tested. Since each hexadecimal word occupies one byte, it is apparent that bits zero to three correspond to the first character in the keys. Thus, as Fred, John, Bill and Eric all start with a "4" there keys are propagated leftwardly along the branch 102 to a second level node 104. However both Zoe and Pete have an initial four bits falling outside of the range zero to three, and consequently their keys are propagated along a high pointer path 106 to node 108.

The nodes 104 and 108 occupy the second level of the decision graph and consequently their decisions are based on the next four bits in the key. This corresponds to looking at the next character in the hexadecimal representation. Thus the node 104 Bill is passed along a low level pointer 110 to a subsequent node (not shown) as bits 4 to 7 in the key encode the value 2, whereas Fred, John and Eric are passed along a high level pointer 112 to a further node (not shown) because bits four to seven in their key encode the values 6, A and 5 respectively in hexadecimal notation. Similarly, at node 108, the key Pete is passed along a low level pointer 114 as bits 4 to 7 therein encode the value zero, whereas Zoe is passed along a high level pointer 116 as bits 4 to 7 encode the value "A". This process can be repeated until sufficient of the key has been searched to reach a conclusion set.

FIG. 7 schematically illustrates how a four bite key can be navigated in a range match search. As with FIG. 6, keys are stored in ASCII coding and the ASCII values against each key to show its value in hexadecimal notation.

In this example, the decision group has a fixed size of eight bits. The decision group is moved down to the next eight less significant bits only when the decision range is exhausted; that is, when the decision value reaches either boundary of the decision range. In this example, the most significant bit is designated bit zero, the next most bit one, and so one as was the case with the example shown in FIG. 6. The decision range at every node is 30 to 50 hexadecimal in order to cover all digits and uppercase letters represented in the ASCII format. The decision value at every node used for a new decision group is 48 hexadecimal, and is then changed to be the average of the previous decision values of the same decision group at each subsequent node for that same group. Where only one previous decision value is known, then the minimum or maximum bound of the decision value range is used depending on whether we have just navigated the left or the right, respectively.

Using the same keys as in the previous example, the keys are presented to a first node 118 which examines the first eight bits, zero to seven, and compares them against the decision value 48 (hexadecimal). With the keys as shown, Fred, Bill and Eric pass along a low pointer to node 122, whereas John, Zoe and Pete along a high pointer 124 to node 126.

At node 122, it becomes necessary to change the decision value. The decision value used for this new decision group is changed to the median value of the previous decision groups reached along the same path. Whereas only one previous decision value is known, as in this case, the minimum or maximum bound of the decision value range is used. Given that four node 122 was navigated against the low pointer 120, then the lower bound of the decision range is used.

Thus, in order to calculate the new decision value it is required to find the median of the numbers in the range 30 hexadecimal to 48 hexadecimal explicitly, this group of numbers is 30, 31, 32, 33, 34, 35, 36, 37, 38, 39, 3A, 3B, 3C, 3D, 3E, 3F, 40, 41, 42, 43, 44, 45, 46, 47 and 48. From this, it can be seen that the median value is 3C. Setting this as the decision value, Fred, Bill and Eric all proceed along the high pointer 127. To the next node (not shown) whose decision value will be the median value of the range extending from 3C hexadecimal to 48 hexadecimal.

Similarly, node 126 reached along the high point 124 from node 118 has a new decision value calculated, which in this instance will be 4C (hexadecimal). Applying the key at this node, John will pass to the left (low pointer) because it contains the value 4A which is less than the decision value of 4C, whereas Zoe and Pete pass to the right hand (high pointer) because they contain the value 5A and 50, respectively, which is greater than the decision value 4C.

A further example of searching can be seen in the context of character searching, thus a search is performed using the following criteria:

An exact match index on an ASCII character key with each character occupying 8 bits and being in the range "A" to "Z" only.

A fixed decision group of 8 bits.

A decision graph origin of the most significant 8 bits (the $1^{st}$ character)

The decision group advances by 8 bits (one character) for each decision node.

The ASCII codes for "A" and "Z" are 65 and 90 respectively. Therefore a sensible decision value for this group is the median value (i.e. 78).

In this example, the decision group advances by one character (8 bits) every time that a new decision node is reached. A comparison is made of the value of the bits in the decision group within the key to the fixed decision value (78) to determine which pointer to follow.

A more sophisticated approach involves changing the decision value at each move to a new decision node. Thus, the decision range for a decision group is limited by the decision range minimum and decision range maximum, which are 65 to 90 respectively. When moving to the next decision node, an operator may choose to select the new decision value by using the median of the current and previous decision value. When this is a new decision group and no previous decision value is available, then we may use the decision range value minimum or maximum (depending on whether a low or high pointer was followed, respectively). The selection of a new decision group may be made when the decision value changes by less than 1 or some other predefined threshold. An example of how a decision value changes is given below.

Decision group in the key has a value of 82. The starting decision value for a new group is 78. The decision range is 65 to 90. The decision group has been set such that a new group is selected when the decision value changes by less than 1.

| Decision Value | Change in Decision Value | Action |
| --- | --- | --- |
| 78 | — | Follow high pointer (82 > 78). New decision value = (78 + 90)/2 |
| 84 | 6 | Follow low pointer (82 < 84). New decision value = (84 + 78)/2 |
| 81 | 3 | Follow high pointer (82 > 81). New decision value = (81 + 84)/2 |
| 82.5 | 1.5 | Follow low pointer (82 < 83). New decision value = (82.5 + 81)/2 |
| 81.75 | 0.75 | Change decision group |

It should be noted that indexes which are not required to support key retrieval by range matching are not so heavily constrained as those that do. In particular indexes that are not required to support range matching can have any decision group at its origin, and can change the decision group position arbitrarily and can also change decision groups arbitrarily when the decision value gets close (as may be defined by the system designer or as may be selected by a user or some management function) to the decision range limits, that is the maximum and minimum values of the decision range, or decision value changes by less than a preselected amount.

When traversing a navigation path for the purpose of inserting, deleting or retrieving a candidate key, the decision group of the candidate key is compared at each decision node visited with the decision value of the decision node and the low pointer or high pointer is followed to the next decision node or conclusion set. Once a conclusion set has been reached the journey along the navigation path is complete. The journey along the navigation path is also complete when a decision group value indicates the use of a decision pointer that does not exist.

A conclusion set consists of a series of keys and associated properties. The number of keys contained within a conclusion set is limited by an upper bound which can be determined by one or more of a combination of:
1. A fixed limit;
2. A limit specified at the time the index is created;
3. A limit that can be specified throughout the lifetime of the index; and
4. A limit that varies as a function of index growth.

FIG. 8 illustrates the procedure for inserting a key (K) with properties (Q). The procedure commences at step 150 where the index is entered at its origin with a default or initial decision group, DG, as set by the designer. An algorithm is implemented in order to calculate a start decision value $DV_0$. Control is then passed to step 152 which tests whether the decision group in the key is greater than the decision value. If the test is satisfied, control is passed to step 154 where the high pointer HP is examined and a new decision value $DV_1$ is created.

From step 154 control is passed to step 156 where a check is performed to see that the pointer (whether this be a high pointer or a low pointer) exists. Similarly, if step 152 indicates that the decision group in the key is not greater than the decision value, then control is passed to step 158 where the low pointer is examined and a new decision value $DV_1$ is calculated. Control passes from step 158 to step 156. From step 156, control is passed to step 160 provided that the pointer exists. Step 160 tests to see if the pointer points to a further decision node. If the pointer does point to a decision node, then control is passed to step 162 which advances the test to the next decision node. From step 162 control is passed to step 164 which performs a test to see whether the decision group should be changed. If the answer to this test is yes, then control is passed to step 166 which calculates the value of the new decision group in accordance with the criteria as set out hereinabove. Control is then passed from either step 164 or 166 back to step 152.

If step 156 determines that a pointer does not exist, control is passed to step 170 to cause the creation of a new conclusion set and then to step 172 which updates the pointer to point to the new conclusion set. Control is then passed to step 174 which adds the key and its properties to the conclusion set.

Furthermore, if step 160 does not point to a decision node, then it must point to a conclusion set and control is passed to step 176 which causes a jump to be made to the relevant conclusion set and from then to step 174 such that the key and its properties are added to the conclusion set.

A test is made at step 175 to see whether the conclusion set has exceeded its size limit. If the conclusion set has not grown too large, control is passed to step 178 which represents an exit from the key insertion procedure, however if the conclusion set has reached its size limit then control is passed to step 180 which creates a new decision node with no pointers. From step 180 control passes to step 182 which updates the pointer of the previous decision node to point to the new decision node rather than the old conclusion set. Control is then passed to step 184 which examines the old conclusion set CS(S) to see if it is empty. If it is not empty control is passed to step 186 which goes to the first key and property entry in the conclusion set CS(S) and re-navigates the index in order to find the new conclusion set into which this entry should be placed. Once the entry has been reallocated to a conclusion set, it is removed from its current conclusion set CS(S) at step 188. Control is then returned to step 184 and the process is repeated until such time as the conclusion set CS(S) is empty. Control is then passed to step 190 which represents an exit point from the key insertion procedure.

Thus, in general, the procedure for inserting a key and its associated properties into the index requires the navigation along the decision path for the key to be inserted. If the navigation path terminates without arriving at a conclusion set, then a new conclusion set has to be created and a decision pointer updated such that it points at the new conclusion set. The new decision pointer must be placed in the decision graph at the point that traversal of the decision graph terminated. However, if the navigation path terminates at a conclusion set, then the key and its properties are inserted into this conclusion set. Each modification of a conclusion set varies the size of that set. Thus, if a new key is inserted into a conclusion set and this causes or would cause the set to exceed its upper bound, then a new decision node has to be created. A new decision group and/or decision value has to be associated with the new decision node and the decision pointer which previously pointed to the full conclusion set has to be amended to point to the new decision node. Then every item from the old (now full) conclusion set has to be reinserted into the new conclusion set or sets following the navigation path along the index.

The data in the database will evolve over time and this evolution will include the deletion of keys and data, either because the data is no longer relevant to the data base or because it needs to be removed for archiving purposes in order that the "live" version of the database does not become cluttered with irrelevant or obsolete data. FIG. 9 schematically illustrates the procedure for deleting a key. Some of the steps are identical to those which were described with respect to FIG. 8, and consequently these steps have been given the same reference numerals. Thus steps 150 to 166 are identical to those already described, with the exception that if the test made at step 156 indicates that the pointer does not exist, then control is passed to step 200 which represents an exit from the deletion procedure.

Step 160 passes control to step 176 if the test at step 160 determines that the pointer does not point to a decision node (as was the case with the procedure for inserting a key). From step 176 control is passed to step 202 where a test is performed to see if the conclusion set CS(S) is empty. If the conclusion set is empty, control is passed to step 204 which represents an exit from the procedure otherwise control is passed to step 206 which implements a scan through the entries in the conclusion set. The scan commences with the first key (L) in the conclusion set and control is then passed to step 208 where a test is made to see if the key (L) is equal to the deletion key. If it is, control is passed to step 210 where the key (L) and its properties are deleted from the conclusion set. From step 210 control is passed to step 214 where a test is made to see if the key (L) is the last key in the conclusion set. Control is also passed to step 214 from step 208 if the key (L)

is not the same as the deletion last key. Control is then passed to step 216 where the next key is selected and control is then passed to 208. Otherwise, control is passed from step 214 to step 218 which represents an exit from this procedure.

Thus, in general terms, to delete a key and its associated properties from the index requires the navigation along the navigation path for the key to be deleted. If the navigation path terminates without arriving at a conclusion set, then it is deemed that the key does not exist in the index. However, if the navigation path terminates at a conclusion set, then a scan must be commenced through a conclusion set for all keys which are exactly equal to the key to be deleted. These keys and their associated properties are then removed from the conclusion set.

FIG. 10 shows the procedure for an exact query of a key, and for returning the result. The procedure shares a great many similarities with the procedure for deleting a key and steps 150 to 206 are as described with reference to FIG. 9. However, an additional step 151 is inserted between the steps 150 and 152 in which a result set (R) is reset to the empty condition. Following navigation of the index to the conclusion set at step 202, control is passed to step 206 which initiates a sequential scan through the conclusion set. From step 206, control is passed to step 230 where a test is made to see if the key (L) currently being examined is equal to the search key. If yes, control is passed to step 232, otherwise control is passed to step 234. At step 232 the key and its properties are added to the search query result list (R), control is then passed to step 234. Step 234 tests to see if the key currently being examined is the last in the conclusion set. If no, the next key is examined and control is passed to step 230. If the key is the last key, control is passed from 234 to step 236 which represents an exit from this routine.

FIG. 11 schematically illustrates the procedure for performing a range query with a minimum key value (I) a maximum key value (A) and for returning the result (R). The procedure commences at step 300 where the results set (R) is reset to a null or empty condition. Control then passes to step 302 where the decision group and decision values are calculated and from then on control is passed to step 304 where the index is traversed in order to find those results which match the range query. The procedure for traversing the index is shown in greater detail in FIG. 12. The procedure commences at step 350 where the procedure is entered at its starting node. Control then passes to step 352 where a test is made to see if the minimum key is less than or equal to the decision value (or omitted) and if the maximum key is greater than its associated decision value (or omitted). If the result of the test is such that both conditions are satisfied control passes to step 370 otherwise control passes to step 354. Step 370 checks to see whether a low pointer has been set, if it has control passes to step 372 where a check is made to see if the low pointer points to a conclusion set. If yes, control is passed to step 400. If no, control is passed to step 374 where the decision group and decision values are recalculated and used to traverse the index from the node reached via the pointer. The procedure has the capability to call itself, and as such is recursive. Control then passes to step 376 where a check is made to see if a high pointer exists, if no, control is passed to step 378 which represents an exit, and if yes, control is passed to step 390 where a test is made to see if the high pointer points to a conclusion set, if yes, control is passed to step 400, whereas if the high pointer does not point to a conclusion set control is passed to step 392 where a new decision group and decision value are calculated and further traversal of the index is performed taking the new node as a start node.

Returning to near the beginning of the procedure, in those instances where step 352 has passed control to step 354, step 354 performs a test to see if both the minimum key value and the maximum key value are less than or equal to the decision value, if they are, control is passed to step 356 otherwise control is passed to step 358. Step 356 performs a test to see if a low pointer exists, if it does not, control is passed to 357 which represents an exit from the procedure otherwise control is passed to step 360. Step 360 tests to see if the low pointer points to a conclusion set, if yes, control is passed to step 400 otherwise control is passed to step 402 which recalculates the decision group and decision value and invokes the traversal procedure in a recursive manner. Returning to step 358, a test is performed to see if the high pointer does exist, if yes, control is passed to step 362 otherwise control is passed to step 364 which represents an exit from the procedure. Step 362 performs a test to see if the high pointer points to a conclusion set, if yes, control is passed to step 400, otherwise control is passed to step 364 which calculates a new decision group and decision value and causes further traversal of the index to be performed starting from these new values.

Step 400 performs a test to see if the conclusion set (S) is empty, if yes, control is passed to step 404 which represents an exit from the procedure. If the conclusion set is not empty, then a sequential scan of those entries in the conclusion set is initiated, starting at step 406 where the first key in the conclusion set is selected. Control is then passed to step 408 where a test is performed to see if the key (L) is within the range defined by the minimum and maximum key values. If the result of the test is "yes" then the key and its properties are added to the conclusion set (S) at step 410 whereas if the test at step 408 is negative control is passed to step 412 in which a test is made to see if the key currently under consideration is the last key in the conclusion set, if it is, control is passed to step 414 which represents an exit from the procedure. Step 410 also passes control to step 412. If the test at step 412 determines that the key under consideration is not the last key, then the next key in the conclusion set is selected at step 416 and control is returned to step 408.

Thus, in general terms, retrieving keys and their range properties by a range match using an optional minimal search key value and an optional maximum search key value requires recursive traversal of the decision graph from the origin, with the continued comparing of the decision group bits in the minimum and maximum search keys with the decision value at each decision node. If the unsigned magnitude of the minimum search key bits in the decision group is less than or equal to the decision value and the unsigned magnitude of the maximum search key bits in the decision group is greater than the decision value then, firstly, action is taken to traverse the decision graph reached from the low pointer using the minimal search key and omitting the maximum search key; and secondly actions are taken to traverse the decision graph reached from the high pointer using the maximum search key and omitting the minimum search key.

If the unsigned magnitude of the minimum search key and the maximum search key bits in the decision group are both less than or equal to the decision value, then a traverse of the decision graph reached from the low pointer using both the minimum search key and the maximum search key is performed. If the unsigned magnitude of the minimum search key and the maximum search key bits in the decision group are both greater than the decision value, then a traverse of the decision graph reached from the high pointer using both the minimum search key and maximum search key is performed.

It is apparent that multiple and repeated traversals of the decision graph are required. If all of the navigation paths resulting from the traversals terminate without arriving at a conclusion set, then it is deemed that no matching keys exist in the index. For those navigation paths which terminate at a conclusion set, then a scan through all of the keys in the conclusion sets is performed and all keys which match the required properties within the search range are returned as search results.

As part of the implementation of the database within a data processor and storage system, it is advantageous, although not mandatory, that the size of the conclusion set should be an integer multiple of the storage device block transfer size, this provides optimal usage of the physical memory. It is also advantageous, though not mandatory, that the decision graph be divided into blocks that are of a size which is an integer multiple of the storage device block transfer size. This has the advantage that, when a decision block becomes full, a new block can be created and new decision pointers can point into the new block as appropriate.

In order to achieve rapid operation of the database, it is advantageous that the decision graph be wholly or partially held, in use, within the semiconductor memory of the data processing system, thereby avoiding the time overheads associated with disk access. As a further enhancement, it is also preferable that the conclusion sets be stored within the semiconductor memory, or that at least, once a conclusion set has been identified, it is swapped into semiconductor memory such that the sequential scanning of the conclusion set can be performed quickly.

The optimal configuration for range matching of all key types is to use a decision bit group of one bit with a fixed decision value of zero. The decision group at the origin is the most significant bit and the decision group advances by one bit (towards the least significant bit) for every decision node visited. For numeric or date/time exact key matching, the optimal bit configuration seems to be to use a decision bit group of one bit with a fixed decision value of zero. The decision group at the origin is the least significant bit and the decision group advances by one bit (towards the most significant bit) for each decision node visited. For the searching of ASCII based keys, the optimal bit configuration for exact matching is to use a decision group of eight bits. The optimal decision values will depend upon the range of expected characters.

Pattern Matching

The database structure described with reference to the proceeding Figures relates to a structure where the decision nodes do not contain any key data whatsoever. However, it is possible to modify the database structure such that one or more nodes contains a partial key sequence. This facilitates the indexing and retrieving of scalar data by pattern matching. The tree structure is still small compared to prior art data bases since each decision node need only contain a relatively modest amount of data rather than the entire key as is the case with prior art systems.

The data base structure requires only minor modification from that already described herein. FIG. 13 shows the structure of the decision graph which in many ways, maintains the same layout as was shown in FIG. 2. However, the origin and each decision node now contains a bit sequence. The bit sequence represents part of the sub-key against which a candidate key is compared. The logical structure of each decision node is shown in FIG. 14. The structure is very reminiscent to that described with respect to FIG. 3. The node, generally designated 440, has a storage region 450 for a decision bit sequence. The decision bit sequence can be of any length. However, the important to note that, in general, the decision bit sequence will be significantly shorter than the length of the key presented to the decision tree. The node includes an exclusion pointer type 452 and an inclusion pointer type 456 which indicate whether their associated exclusion pointers or inclusion pointers point to a further decision node or to a conclusion set. Thus these pointers perform the same function as the low pointer type and high pointer type 41 and 44, respectively, described with reference to FIG. 3. The exclusion pointer 454 and an inclusion pointer 458 point to the address of the next node or conclusion set following the present node. Thus, the pointers 454 and 458 are analogous to the low pointer and high pointer 42 and 45, respectively, described hereinbefore. However, the change of terminology merely clarifies the fact that one pointer is followed if the candidate key contains the decision bit sequence, whereas the other pointer is followed if the candidate key does not contain the decision bit sequence.

FIG. 15 shows the procedure for inserting a key into the tree structure. This procedure is very similar to that described with respect to FIG. 8, and like reference numerals have been used for like parts for brevity. However, step 152 is modified to become step 152' as the test is changed to see whether the decision bit sequence at a decision node is contained within the key, if yes, control is passed to step 154' where the inclusion pointer is followed. Control then passes to step 156. If step 152 finds that the decision bit sequence is not in the candidate key, then control passes to step 158' where the exclusion pointer is followed. A further modification to the procedure is that step 162 can point directly to the input of step 152', thereby omitting steps 164 and 166. However, otherwise the key insertion procedure is as hereinbefore described.

The procedure for deleting the key, as shown in FIG. 16, is also very similar to that described hereinbefore and once again, like reference numerals are used for like parts. As was the case with the procedure for inserting the key, steps 152, 154 and 158 are modified to become steps 152', 154' and 158' as described with reference to FIG. 13, such that steps 152 tests to see whether the candidate key includes the decision bit sequence, and if yes, the inclusion pointer is followed, and if not, the exclusion pointer is followed. Additionally, step 162 now points directly to the input of step 152', thereby omitting step 164 and 166.

The index can, of course, be navigated for exact query matching of the key. FIG. 17 illustrates the navigation procedure for returning an exact query of the key. The procedure is very similar to that described with reference to FIG. 10 and, as before, like reference numerals will be used for like steps in order to avoid repetition, and except for the fact that steps 152, 154 and 158 are modified such that step 152' now compares the candidate key with the decision bit sequence, and if the decision bit sequence is within the candidate key, control is passed to step 154' where the inclusion pointer is followed, otherwise control is passed to 158' where the exclusion point was followed. Additionally, step 162 now points directly to the input of step 152'. FIG. 18 shows the procedure for traversing from a node with a pattern list (L) and returning a result (R). The procedure starts at step 500 where a start node is entered. Control is then passed to step 502 where a test is made to see if the decision bit sequence is contained within the pattern list (L). If the result of this test is negative, then control is passed to step 504 where a test is made to see if an exclusion pointer exists from the decision node. If an exclusion pointer does exist, then control is passed to step 506 where a test is made to see if the pointer points to another decision node, if it does control is passed to step 508 otherwise control is passed to step 510. Step 508 causes the next decision node to be selected and the traversal procedure is called in a recursive manner at step 512. From step 512 control passes to step 514. Additionally, if the test at step 502 concludes that the decision bit sequence is contained within the pattern list, then control passes to step 514, similarly control also passes to step 514 if step 504 indicates that the exclusion pointer does not exist.

Returning to step 510, this causes a jump to be made to the conclusion set pointed to by the pointer examined at step 506, and then a search is made through the conclusion set at step 516. The search procedure will be described hereinafter with reference to FIG. 19. From step 516, control is passed to step 514. Step 514 performs tests to see if the inclusion pointer exists, and if it does control is passed to step 518, otherwise control is passed to step 520 which represents an exit from the procedure. Step 518 tests to see if the pointer points to a further decision node, if it does control is passed to step 522 which calls the procedure again in a recursive manner, otherwise control is passed to step 524 which causes a jump to the conclusion set pointed to by the pointer. From step 524 a search is performed of the conclusion set at step 526 which is the same as step 516. Step 526 and 522 both point to an exit step, step 528 representing an end to the procedure.

FIG. 19 schematically illustrates the search procedure of steps 516 and 526. The procedure is entered at step 530, from where control passes to step 532. Step 532 performs a test to see if the conclusion set is empty, if it is the procedure is exited at step 534 otherwise control is passed to step 536. Step 536 selects the first key in the conclusion set and then passes control to step 538 which tests to see whether the key contains every pattern in the pattern list. If it does, control is passed to step 540 otherwise control is passed to step 542. Step 540 adds the key and its properties from the conclusion set to the results list. It then passes control to step 542. Step 542 performs a check to see if the current key is the last key in the conclusion set, if it is, the procedure is exited at step 544 otherwise control is passed to step 546. Step 546 selects the next key in the conclusion set and return control to step 538.

FIG. 20 schematically illustrates how a range search can be performed using a database constituting an embodiment of the present invention. Suppose that node 560 has the bit pattern RE stored therein and node 562 has the bit pattern OH. When the node is queried with the words red, Fred, Bill and John, the words red and Fred are directed along the include path towards a further node 564 whereas the words Bill and John are directed along the exclude path to node 562. Node 562 directs the word Bill along the exclude path, and the word John along the include path as it contains a bit pattern "OH".

If the database is now queried using a wild card search, for example, using the search string "*red*", where * represents a multi-character wild card, then node 560 can determine that the exclude path towards 562 does not need to be searched, and hence the search can be limited to the path including the node 564. However, if the index is queried using the search term "*lap*" then node 560 is unable to determine whether the bit pattern RE is in the search string (as it may be contained within the wild card portion) and consequently the index has to search along both the include and exclude paths.

It is worth noting that the position of the bit pattern in the key does not have to move sequentially along the key as one navigates from node to node in the database.

Key Compression

In conventional data base systems the entirety of the key is stored at each decision node. Whereas, in the invention described hereinabove a portion of the key was stored at each decision node, although the length of that portion is not constrained. The applicant has realised that further space savings can be obtained by storing not the entirety of the key or a sub-portion of the key in its native form, but an expression of that key derived from a result of a mapping process. Hash code algorithms, such as CRC32 and Adler 32 are well known and provide a function for mapping encoding key values. These algorithms operate on a long bit sequence to derive a much shorter bit sequence. The mapping algorithm is such that it is deterministic, in that if the input bit sequence is always the same the derived bit sequence is always the same. However, the mapping cannot be unique due to the high degree of compression obtained and consequently several input sequences will map onto a much shorter output sequence. Nevertheless, by accepting this consequence, the designs of the index can be considerably reduced. Thus, when navigating the tree graph for a candidate key K, the conventional traversal method is followed except that the value A(K) is used instead of K, where A is the map function used for the tree graph.

Because two or more keys may map the same function, the conclusion set may contain information which would not have been reached had the mapping function not been used.

It is therefore necessary to examine those entries in the conclusion set in order to exclude those which do not correspond to the unmapped key. This can be done by holding the unmapped key in the conclusion set and comparing those keys with the original unmapped search key in order to exclude those terms that do not match it. However, a space saving may also be achieved by encoding the keys in the conclusion set with a second coding algorithm B, where B is different to A. The likelihood of an incorrect search key mapping to two identical map values under both mapping algorithms is very small indeed and consequently it is highly unlikely that a false map would be obtained. Indeed, the probability of a false match is approximately one in $R^2$, where R is the range size of the function map. Both mapped key A and B are stored in the conclusion set as this facilitates re-mapping of the conclusion set should it reach its maximum size.

To insert a key into the index, the key is encoded using the first hash function. The index is then navigated using the encoded key via the navigation methods described hereinabove or conventional methods, until a conclusion set is reached. The key can then be inserted into the conclusion set in either an un-encoded form, or encoded using a second hash function.

Deletions are similar, with the key being deleted from the conclusion set in either its native form, or using the encoded value form as a result of operating on the key using the second hash function.

It is thus possible to provide an efficient method of encoding database keys in a form where their size is much reduced, and where the use of double encoding using dissimilar functions reduces the risk of false matches to an acceptably small occurrence.

Bounded Key

FIG. 21 schematically illustrates an index constituting an embodiment of the present invention. Conceptionally, the index looks like that of a conventional B tree index. However, rather than entire native keys being included within each node of the decision tree, a encoded version of the key is used, where the key is mapped using a modulo arithmetic function. It also follows, that where only part of the key is unbounded, then only part of the key needs to be mapped in accordance with the present invention. Thus, when a key is presented to the index for searching, deletion or insertion, a standard modulo function is applied to the key prior to its use. To apply the modulo to a character string key type, requires the string to be treated as a very large unsigned magnitude integer of multiple bytes with the first character being the most significant byte in the integer value, and then applying the modulo.

Thus, to insert a key into the index, the key is encoded using the modulo chosen for the index. The index structure is then navigated, as described hereinbefore, to a conclusion set (leaf block) using the encoded key value via standard index methods, or methods presented herein. The key is then inserted into the conclusion set in either its native form or in its encoded form. Deletion and searching are performed in similar ways. Thus, in a search once a conclusion set has been reached, the key is compared with all the key values in the conclusion set, either in their native or encoded forms.

FIG. 22 schematically illustrates the possibilities that may occur when an operator wishes to run a range match, rather than an exact match as described hereinabove. The minimum and maximum search keys for the range are represented as L (lower) and U (upper) respectively. These keys exist in an unbounded or unmapped search space 580 as shown in FIG. 22. The keys are then mapped through the modulo process 582 in order to convert them into the bounded range of the index. It cannot be guaranteed that the order of the keys will be preserved after the mapping process. This gives rise to two possibilities. Firstly, as shown in the mapped set schematically designated 584, the mapped lower key has a value less than the mapped upper key. If this is the case, then the index is navigated to a conclusion set using standard index navigation methods. However, as also contemplated and schematically illustrated in map set 586, the mapped lower key 14L may have a value greater than the mapped upper key MU. In this instance, the search must be made of all conclusion sets having encoded values that are greater than or equal to the encoded minimal key ML. This search is performed using standard index navigation methods. Additionally, a search must be made for all conclusion sets having encoded values less than or equal to the encoded maximum key MU. Once again, this is performed using standard navigation methods.

It should be noted that this technique-can only work when the difference between the keys is less than the domain of the modulo encoding scheme. Thus, as a trivial example, if the keys were mapped using a modulo ten, then the difference between the lower and upper keys in the search range must be less than ten.

Transient Keys

FIG. 23 schematically illustrates the data structure of a conclusion set/leaf block 600 constituting an embodiment of the present invention. The conclusion set contains an age base 602 which represents the date and time of the most recent update to the conclusion set 600. It also contains a plurality of key entries 604, 606 and 608. Considering only key entry 608 for brevity, this is further divided into three parts, namely an entry age 608A, entry key information 608B and entry property information 609C.

When a transient entry is made, it has entry age data 608A associated with it. This data refers to an age unit and an age limit which may be set for the index as a whole, but optionally could be set for individual conclusion sets. The age unit specifies the number of seconds in a single age unit. Thus, for example, a value of 60 implies one minute, whereas 86400 implies one day. The age limit represents the number of age units after which the key may be lost from the index. This is typically in the range of 1 to 254, thereby enabling it to fit within an 8 bit word. Thus, if a key is set to expire after 31 days, the age unit is set to 86400 seconds and the age limit is set to 31. For keys to expire after one day, the age unit and age limit may be set to 3600 seconds and 24, respectively.

Each entry contains an entry age, expressed in one byte for efficiency, and this can be set between the value zero and 255, in this example, although other value ranges may be chosen as appropriate. Zero indicates that an entry is new, or less than one age unit older than the age base. 255 indicates that the entry is obsolete.

For each update or insertion in the conclusion set, the following sequence is followed. Firstly the current date and time is noted, and then the number of elapsed age units between the age base and the current data and time is calculated. Then, every entry in the conclusion set has its entry age incremented by the number of elapsed age units. Any entry with an entry age calculated to be greater than or equal to 255 has its entry age set to 255.

Any such entry then becomes available for re-use. Then the age base is set to the date and time noted at the beginning of the procedure. Any key to be inserted is placed into an available slot in the conclusion set and is set to an entry age of zero. An available slot may either be a slot which has not yet been allocated, or a slot which has become obsolete (because its entry age has reached 255). Furthermore, any entry which is updated has its entry age reset to zero.

In the above embodiment, the entry age was stored as a single byte. This gives a range of 254 time periods in which a type of data may become obsolete. It is possible to use more than one byte giving a wider range of age limits, but with an increased storage overhead. Alternatively, less than one byte may be used as the entry age, thereby reducing storage overhead, but also reducing the range of age limits that can be individually defined.

It is thus possible to provide an improved database.

Decision Graph Splitting

As discussed hereinbefore, it is preferable that the entirety of the decision graph (index) is held within semiconductor memory as this allows fast access. However, the capabilities of the hardware platform running the database or the size of the database may be such that it is not possible to hold the entirety of the index within semiconductor memory or the time. This may, for example, be because the machine is expected to multi-task and perform other functions.

It is well known that mass storage devices, such as hard disk drives, are divided into blocks of a predetermined size a file of any size less than the block size still occupies one block. Thus, physical memory is used in multiples of the block size. When reading and writing the decision graph to such a memory, it is preferable that the decision graph is structured in such a way that the entirety of it, or as much as possible, is written to a single block. Thus, a decision graph is likely to reside within a block of memory. However, as the index becomes increasingly populated, the decision graph grows as the key population grows. There therefore becomes a time when it becomes impossible to accommodate the decision graph within a single block. Thus methods of accommodating the decision graph across multiple blocks are required.

With reference to FIG. 24, suppose that memory block 700 represents the physical size of a block on the hard disk of a computer system, and that the block is subdivided to contain individual portions 702, 704, 706 and 708, amongst others, each of which relates to the data in respect of an associated node within the decision graph. Furthermore, suppose that the index has now reached such a size that the block 700 is completely full.

Now suppose that as a result of a database insert operation, it is required to insert a further node into the decision graph. The node insertion may occur at any point. As noted hereinbefore, each decision node (FIG. 3) comprises a decision value, and a low pointer and a high pointer which indicates the next node in the graph. As a result, local amendments to the graph can be made such that a new node can be inserted after any existing node. Thus, supposing that as a result of an insert, it is required to insert a new node following the node whose data is represented by data item 706. Firstly, as the new node is inserted one of the output pointers of node 706 is modified to point to the new node. As part of the insert process the output pointers of the new node are also set up correctly such that the decision graph does not become broken. However, given that it is no longer possible to store the data relating to the new node, 710, in the memory block 700, the details relating to new node 710 must be stored in a further block 712. Further nodes relating to that new node may also be created and information stored in the memory block 712.

If at a later time, it is required to insert a new node relating to an earlier existing node, 708, then again the memory block 700 becomes fall and consequently the details of a further new node 714 must be stored outside of the memory block 700. This process allows the decision graph to grow, but can result in the spawning of a large number of nearly empty memory blocks from each full (parent) block.

FIG. 25 illustrates an alternative method for growing the index. Again, assume that memory block 700 is full and that it is now required to insert a new node. As before, a new memory graph block is created. But now the parent decision graph is split into equal parts. One part is placed in the old block 700 whilst the other part is placed in the new block 712.

With reference to FIG. 25, assume initially that the index 720 is stored within memory block 700 and that block 700 is now full. Supposing that an index insert results in the creation of new node 722, and at this process causes the index to exceed the size of the memory block 700. However, in this method of controlling index growth, the structure of the indexes analysed so as to split it substantially equally between the index blocks. Thus, taking the portion of the index shown in FIG. 25, it can be seen that starting at node 724; ten nodes, encircled by chain-dot line 726 can be reached by the path extending to the left of the node 724, whereas twelve nodes encircled by chain-dot line 728 can be found in the path extending to the right of node 724. An algorithm recursively scans the index structure, by selecting a test node and then calculating the nodes depending therefrom in order to find a suitable candidate node for splitting the index. In the example shown in FIG. 25, node 724 and the nodes encircled by line 726 would be placed in the old memory block 700, whereas the nodes encircled by chain-dot line 728 would be placed in the new memory block 712. This process ensures that each memory block is optimally and equitably utilised and stops the proliferation of substantially empty memory blocks.

Qualifiers

Frequently, it is desired that the search term in the index should be performed using two or more search criteria. These criteria are combined, generally recording to the principles of boolean algebra.

It is possible for the query to be divided down into individual parts with each part being performed before the next is down and then the results combined at the end. This, however, can be very computationally intensive and require many read write operations to a block data store, such as a hard disk. Thus, for example, a query which returned 100 hits might then require another 100 slow disk I/O operations in order to fetch the data pointer to by the index query.

Not all of the data fetched by the query may be required. Thus, if a query was made of a database to find all cars registered in 1997 that were Mercedes, the query for cars registered in 1997 would return many thousands of results. However, only a small number of these have been a Mercedes. Furthermore, for many queries it may not be possible in order to change the order of the query in such a way as to reduce the number of unwanted results.

This problem can be overcome by using concatenated keys. However, hitherto such concatenated keys have maintained the entirety of both the primary search key and the subsidiary search keys in the combined concatenated key and consequently the combined key becomes particularly long.

The applicant has realised that improved search performance can be made by associating qualifiers, and in particular appending qualifiers, to the primary search key. The qualifier does not directly the represent the second or subsequent search term, but rather is a shortened form of that subsequent term. In the present invention, the qualifier is generated by performing a hashing function on the or each subsequent search term. The same hashing function is used to query a database as is used to insert or delete data from it. Thus, during creation of the database, the index is created with a principal key (as before) and with zero or more qualifier keys.

In use, the index is navigated by using the principal key and data is stored in the conclusion sets in the usual way. However, each qualifier key is hash encoded down to a single byte, that is a number in the range zero to 255, and is stored alongside the key entry in the conclusion set.

During a query, the principal key is supplied with zero or more qualifier keys. The index is then navigated using the principal key, as before. Finally, once the correct conclusion set or sets are reached, these are then scanned by matching the principal key value and the qualifier key hash codes with the entries in the conclusion set. Only those entries that match all of the principal key and all of the qualifier hash codes are returned.

It will be noted that multiple qualifier keys can map to the same single byte hash code. There is therefore a small but finite probability that unwanted data will be returned. However, assuming that a good randomising hash encoding is used, the probability of a wrong match is one in 255 (or less than 0.5%) it can be seen that the present invention guarantees to return all the correct results, but with a small percentage of incorrect results as well. Thus all the key hits returned must then be inspected in a data store to remove any of the unwanted entries. However the reduction in size of the index and the simplification of the query process more than compensates for the additional analysis of the returned hits. This advantage increases as more qualifiers are used given that the probability for an incorrect hit decreases with an increasing number of qualifiers. The probability of a bad result is, under ideal circumstances, $(1/255)^N$. Thus, with two qualifiers (N=2) the probability of a bad result is 1 in 65025 or less than 0.002%. With three qualifiers, the chance of returning an incorrect item of data reduces to approximately 14 million to 1.

It would be seen that, the size of the search key, and data storage requirements within the conclusion sets, is much reduced. Thus, if it had been intended to search on 8 terms, each of which could be up to 8 bytes long, this would conventionally require storage of 64 bytes of data for each search key. In the present invention, this requirement is reduced to a mere 15 bytes of data.

When querying the database, each qualifier key is optional and none, any or all of the keys may be supplied because they do not affect navigation of the index structure. The qualifier keys only affect the number of hits which are returned when scanning the conclusion sets. Thus, the more qualifiers that are supplied the more precise the query result.

It should be noted that this qualifier technique can be applied to any index structures, for example well known structures such as the B-tree. FIG. 26 schematically illustrates the format of search key in accordance with this aspect of the present invention in which a first portion of the key contains the primary key data, and then the remainder of the key comprises the qualifiers Q1, Q2 and so on to Q7, each of which is a 1 byte long word produced by a hashing function on the original additional keys.

Pattern Matching

It is often desirable to do a pattern matching query within a database. Thus, rather than searching on the entirety of a search key, a search is performed using a sub-portion of the key.

The efficiency of such searching depends on how well the key population is divided in each node in the decision graph.

A problem with the ASCII character set is that it comprises 255 characters, but that the likelihood of some characters appearing is very high and yet combinations of dual characters is particularly rare.

The applicant has realised that pattern matching can be much improved if the ASCII character set (or indeed an equivalent set) is mapped to a smaller set.

The applicant has defined a number of mappings which reduce the set to 16 characters so that a single character fits within four bits (0-15) whilst a two character sequence can fit within a single byte.

These modified character sets can then be used in a single index to divide down the key population.

The mapping of the character set is applied to the key just prior to navigation of the decision graph for an insert, delete or query operation. Either the original key value or the converted key value (being of smaller size) can be stored with conclusion set depending on whether accurate or probabilistic query results are required. Examples of two character sets are given below:

| ASCII Characters | Mapped Value |
| --- | --- |
| Phonetic Set | |
| Vowels (A, E, I, O, U) | Removed |
| Digits (0, 1, 2, 3, 4, 5, 6, 7, 8, 9) | Removed |
| Punctuation characters | Removed |
| Space, Tab | 0 |
| B | 1 |
| C, K, Q | 2 |
| D | 3 |
| F | 4 |
| G, J | 5 |
| H | 6 |
| K | 7 |
| L | 8 |
| M, N | 9 |
| P | 10 |
| R | 11 |
| S, Z | 12 |
| T | 13 |
| V | 14 |
| W | 15 |
| X, Y | Removed |
| Similarity Set | |
| Space, Tab | 0 |
| Punctuation characters | 1 |
| Digits (0, 1, 2, 3, 4, 5, 6, 7, 8, 9) | 2 |
| Vowels (A, E, I, O, U) | 3 |
| B, D | 4 |
| C, K | 5 |
| F, P | 6 |
| G, J | 7 |
| H, Y | 8 |
| K, L | 9 |

-continued

| ASCII Characters | Mapped Value |
| --- | --- |
| M, N | 10 |
| P, Q | 11 |
| R, S | 12 |
| T | 13 |
| V, W | 14 |
| X, Z | 15 |

In each of these schemes, characters are converted to uppercase such that the query is non-case specific. Furthermore, non-printing characters such as line feed and a character return are removed from the mappings.

By utilising this reduced set the performance of pattern matching can be much improved. The keys are mapped prior to insert, query or delete operations, and then the index is navigated using the mapped key.

The invention claimed is:

1. A computer-implemented method of organising a database, encoded in a computer-readable storage medium, which in use comprises an index and data and wherein the index is queried using a search criterion comprising at least one key, each key comprising a plurality of bits, in order to locate data matching the search criterion, wherein the index is a hierarchical structure of nodes that is navigated during a search until a conclusion set satisfying the search criterion is reached, and wherein the index is searched by comparing, at each node, a decision group within the search key with a decision value associated with the node to determine whether the decision group is greater or less than the decision value, wherein the number of bits in the decision group can be set to include any number of bits between a single bit and all the bits of the key, wherein at least some of the decision groups comprise a plurality of bits less than all the bits of the key, wherein the decision value associated with each node can be set to a chosen value, and wherein each node has less than three exit paths therefrom, further comprising returning a query result that corresponds to the conclusion set.

2. A method as claimed in claim 1, characterised in that the nodes do not store the entirety of the key associated with the node.

3. A method as claimed in claim 1, in which the nodes do not store the decision rules relating to interrogation of the node.

4. A method as claimed in claim 1, in which the decision at each node is a simple query and that there is a maximum of two exit paths from each node.

5. A method as claimed in claim 4, in which, at a node, the key or part of the key being used for a query is compared with the decision criterion at the node, and the test applied is whether the key or part thereof is greater or less than the decision criterion.

6. A method as claimed in claim 1, in which every record in the database belongs to a conclusion set.

7. A method as claimed in claim 1 in which, in use, the hierarchical structure of decision nodes forms a decision graph held within the electronic memory of a data processor.

8. A method as claimed in claim 6, in which each conclusion set has a maximum size.

9. A method as claimed in claim 8, in which the size of a conclusion set is the same as or is a multiple of the size of a data or address block used in a data storage device.

10. A method as claimed in claim 8, in which as a conclusion set approaches a predetermined size, a new decision node is inserted into the hierarchical structure of nodes and the data which was in the conclusion set is re-indexed into new conclusion sets reached via the exit paths of the new decision node.

11. A method as claimed in claim 10, in which the new decision node is inserted in the exit path from a node that pointed to the conclusion set that reached the predetermined size.

12. A method as claimed in claim 1, in which, structural re-organisation of the database only affects one or two decision nodes at a time.

13. A method as claimed in claim 1, in which the decision nodes are related to portions of the search key.

14. A method as claimed in claim 13, in which the decision graph is largely independent of the structure of the key.

15. A method as claimed in claim 1, in which the hierarchical structure of nodes is structured such that a semantic order of key sequences is preserved.

16. A method as claimed in claim 6, in which each entry in the conclusion set comprises a link field pointing to the next item in the conclusion set, a key field holding the exact value of a key associated with the entry in the conclusion set and a properties field which holds one of the data corresponding to the key or a pointer pointing to the data corresponding to the key.

17. A method as claimed in claim 1, in which each node has an associated decision value which is compared, in use, with a decision bit group in a key, and the result of the comparison is used to select an exit path from the node.

18. A method as claimed in claim 17, in which the decision value is selected from one of:
   the mathematical median of all possible values of the decision groups;
   the mathematical median of the expected values of decision groups;
   the mathematical average of all expected values of the decision group;
   a predetermined value selected at the creation of the index; and
   a value selected as a function of the most recently used decision value and the decision value preceding that one.

19. A method as claimed in claim 17, in which the selection of a decision group at a visited decision node is selected from one of:
   a decision group which is the same for all nodes;
   a decision group which changes on every visit to a decision node;
   a decision group which changes when a decision value at a preceding node reaches a decision range maximum or decision range minimum of the current decision group; and
   a decision group which is changed when the decision value between successive nodes would change by less than a predetermined threshold.

20. A method as claimed in claim 1, in which, when adding data, the index is navigated until a conclusion set is reached, or the need to create a conclusion set is identified, and the data is then added to the conclusion set.

21. A method as claimed in claim 1, in which one or more of the nodes contains a partial key sequence.

22. A method as claimed in claim 16, in which the key stored in the conclusion set is stored in a compressed form.

23. A method as claimed in claim 22, in which the compression maps the key to a smaller representation of the key.

24. A method as claimed in claim 23, in which the mapping is well behaved such that when the mapping is applied to a given key it always returns the same result.

25. A method as claimed in claim 22, in which the key is compressed using at least two dissimilar algorithms.

26. A method as claimed in claim 25, in which the results of the at least two compressions are stored in the conclusion set.

27. A method as claimed in claim 1 in which keys are processed by an operator which maps the key to a bounded range.

28. A method as claimed in claim 27 in which the operator distributes keys substantially uniformly throughout the database.

29. A method as claimed in claim 27 in which the operator is selected from one of a modulo function and a hashing function.

30. A method as claimed in claim 1, in which keys stored within conclusion sets include a data field indicating the duration for which the key and its data should be maintained within the database.

31. A method as claimed in claim 30, in which keys and data which have expired are made available for overwriting with new data.

32. A method as claimed in claim 30, in which expired keys and data are not actively deleted from the database.

33. A method as claimed in claim 30, in which when a conclusion set is accessed the age of each entry having a duration is calculated and the results of the calculation may be stored or used to determine which entries can be overwritten.

34. A method as claimed in claim 1, in which the database comprises a key index and a decision index, wherein the keys in the key index are stored in a compressed manner, and wherein a check is made of the key index to see if the key exists prior to interrogating the decision index using the key.

35. A method as claimed in claim 34, in which the decision index is not searched if the key does not exist in the key index.

36. A method as claimed in claim 34, in which, during an operation to insert a key, a check of the key index is made and the key is rejected as duplicate if a matching entry is found.

37. A method as claimed in claim 34, in which the keys in the key index are stored in a compressed, encoded or mapped form.

38. A method as claimed in claim 37, in which the keys are mapped using a hash function.

39. A method as claimed in claim 34, in which the key index comprises an array of elements, the number of elements in the array being at least as large as the number of unique key elements within the index.

40. A method as claimed in claim 39, in which two dissimilar functions are used, where one hash function is used as part of a process to calculate a destination element E(K) within the key index and the other hash function is used to encode the key and the result B(K) is stored at the destination element.

41. A method as claimed in claim 40, in which during a query of the key index, the destination element is calculated for a target key, and the encoded value using the second hash function is calculated for the target key, and the key is deemed to be duplicate if the encoded value matches a pre-existing value in destination element.

42. A method as claimed in claim 1, in which the index comprises a hierarchical structure of indexes such that an index can delegate some of its workload to at least one other index.

43. A method as claimed in claim 42, in which an index which has had work delegated to it can delegate work to other indexes.

44. A method as claimed in claim 42, in which a key manifest of an index is defined by a range and any request to operate on a key outside of the range is rejected by the index.

45. A method as claimed in claim 44, in which if the key is within the index range of the database, the database can perform an operation on the key itself or delegate the task if the key is within the manifest range of any of the delegate indexes.

46. A method as claimed in claim 42, in which each index is associated with a physical storage device, thereby allowing multiple concurrent disk accesses to occur.

47. Computer readable instructions stored on non-transitory computer readable storage medium for causing a computer to perform the method as claimed in claim 1.

48. A data storage system comprising:
a processor;
a computer-implemented database, encoded in a non-transitory computer-readable storage medium, which in use comprises an index and data and wherein the index is queried using a search criterion comprising at least one key, each key comprising a plurality of bits, in order to locate data matching the search criterion, wherein the index is a hierarchical structure of nodes that is navigated during a search until a conclusion set satisfying the search criterion is reached, the index is searched by comparing, at each node, a decision group within the search key with a decision value associated with the node to determine whether the decision group is greater or less than the decision value, wherein the number of bits in the decision group can be set to include any number of bits between a single bit and all the bits of the key, wherein at least some of the decision groups comprise a plurality of bits less than all the bits of the key, wherein the decision value associated with each node can be set to a chosen value, and wherein each node has up to two exit paths, further comprising returning a query result that corresponds to the conclusion set.

* * * * *